May 29, 1928.
N. W. PERKINS
1,671,780
TICKET PRINTING, RECORDING, AND INDICATING APPARATUS
Filed Aug. 12, 1921 16 Sheets-Sheet 1
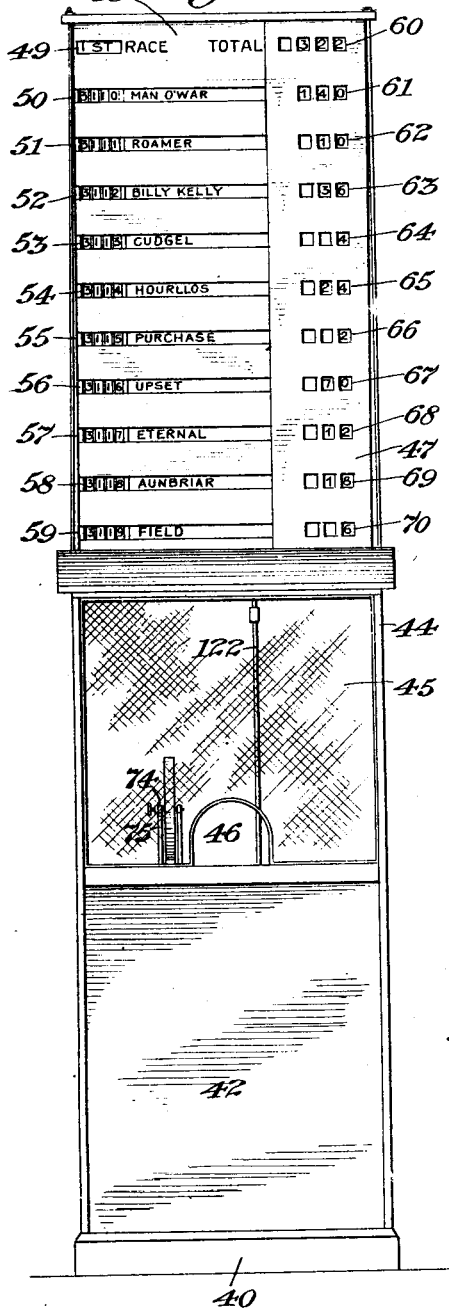
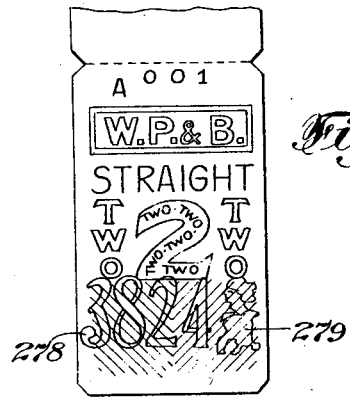
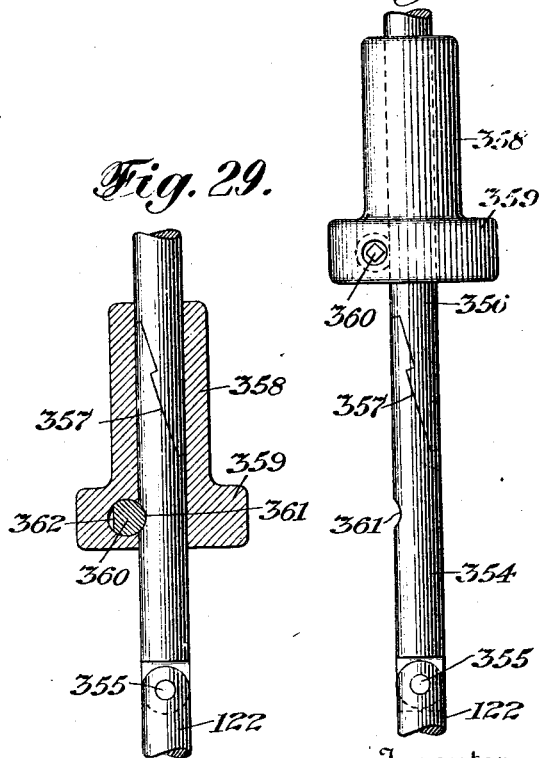
Inventor
Nathan W. Perkins
By his Attorneys May 29, 1928.
N. W. PERKINS
1,671,780
TICKET PRINTING, RECORDING, AND INDICATING APPARATUS
Filed Aug. 12, 1921 16 Sheets-Sheet 2
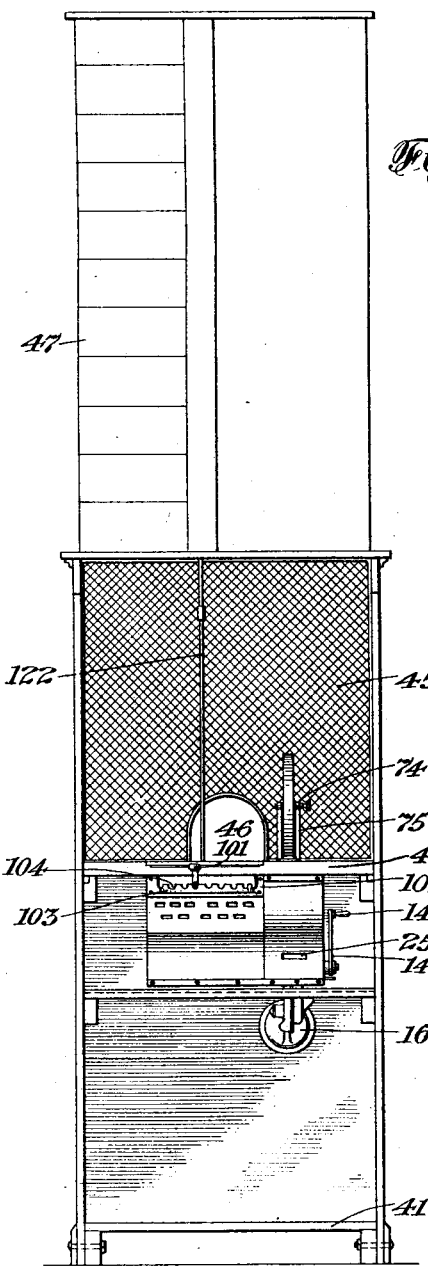
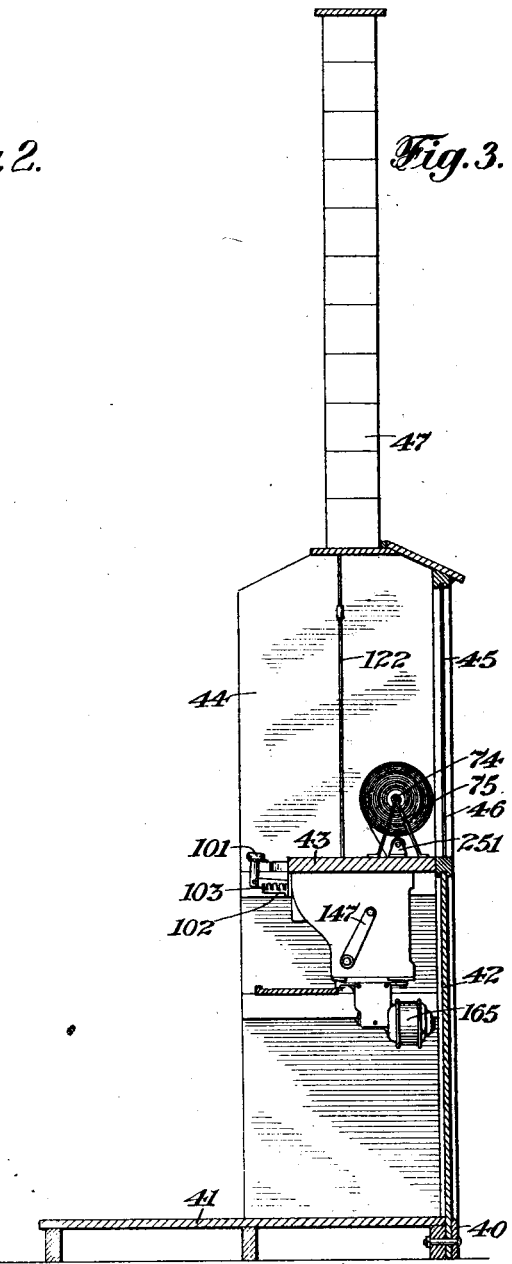

May 29, 1928.

N. W. PERKINS 1,671,780

TICKET PRINTING, RECORDING, AND INDICATING APPARATUS

Filed Aug. 12, 1921 16 Sheets-Sheet 3

Inventor
Nathan W. Perkins
By his Attorneys

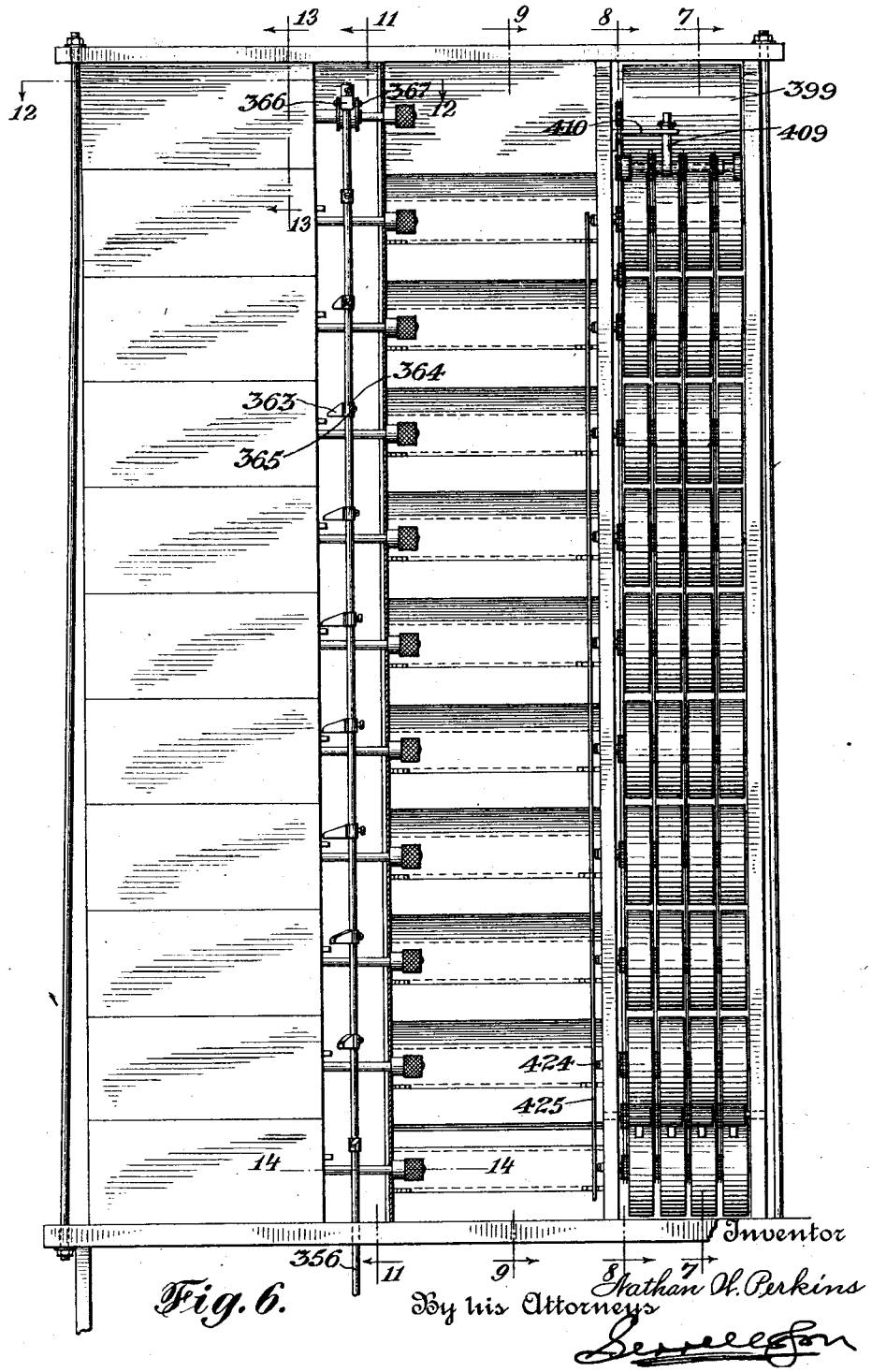

May 29, 1928. 1,671,780
N. W. PERKINS
TICKET PRINTING, RECORDING, AND INDICATING APPARATUS
Filed Aug. 12, 1921 16 Sheets-Sheet 5
Fig. 7. Fig. 8. Fig. 9.
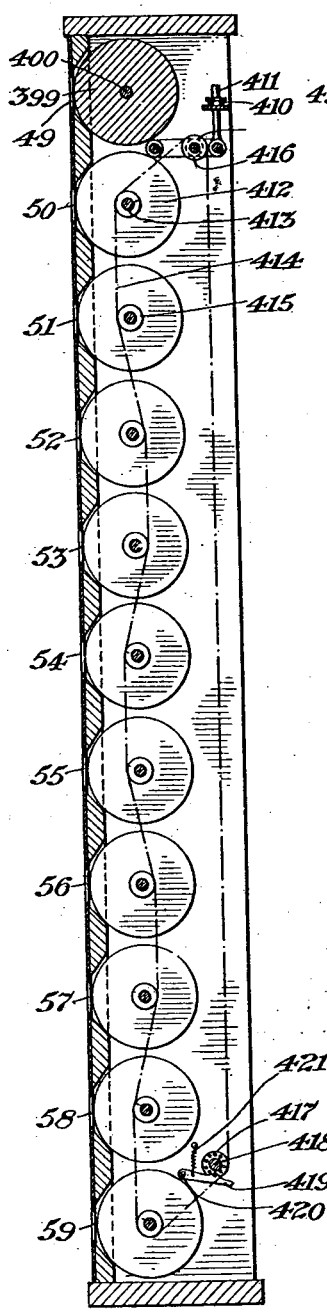
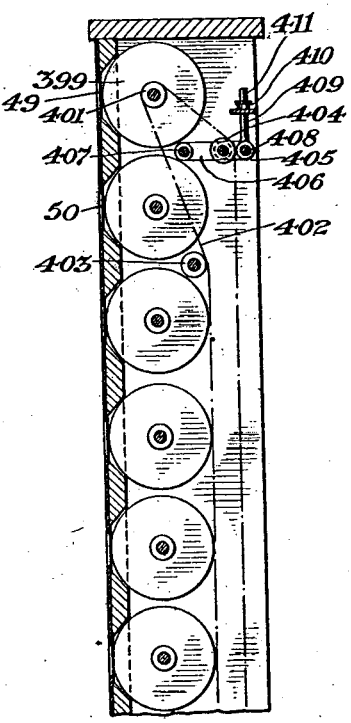
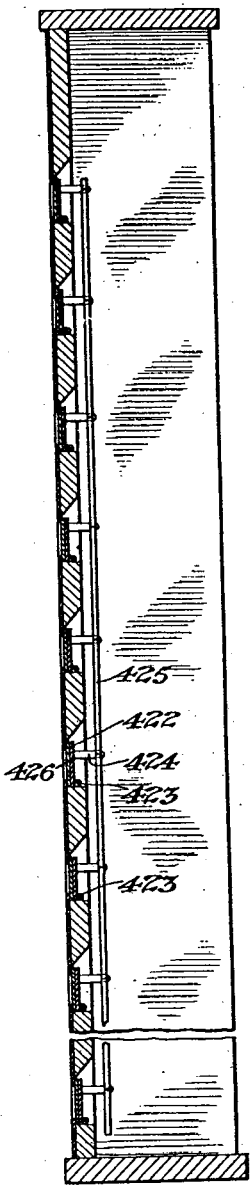
Fig. 10.
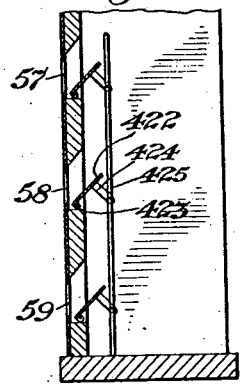
Inventor
Nathan W. Perkins
By his Attorneys May 29, 1928.

N. W. PERKINS 1,671,780

TICKET PRINTING, RECORDING, AND INDICATING APPARATUS

Filed Aug. 12, 1921     16 Sheets-Sheet 6

Inventor
Nathan W. Perkins
By his Attorneys

May 29, 1928.

N. W. PERKINS 1,671,780

TICKET PRINTING, RECORDING, AND INDICATING APPARATUS

Filed Aug. 12, 1921    16 Sheets-Sheet 9

Inventor
Nathan W. Perkins
By his Attorneys

May 29, 1928.  1,671,780
N. W. PERKINS
TICKET PRINTING, RECORDING, AND INDICATING APPARATUS
Filed Aug. 12, 1921   16 Sheets-Sheet 12
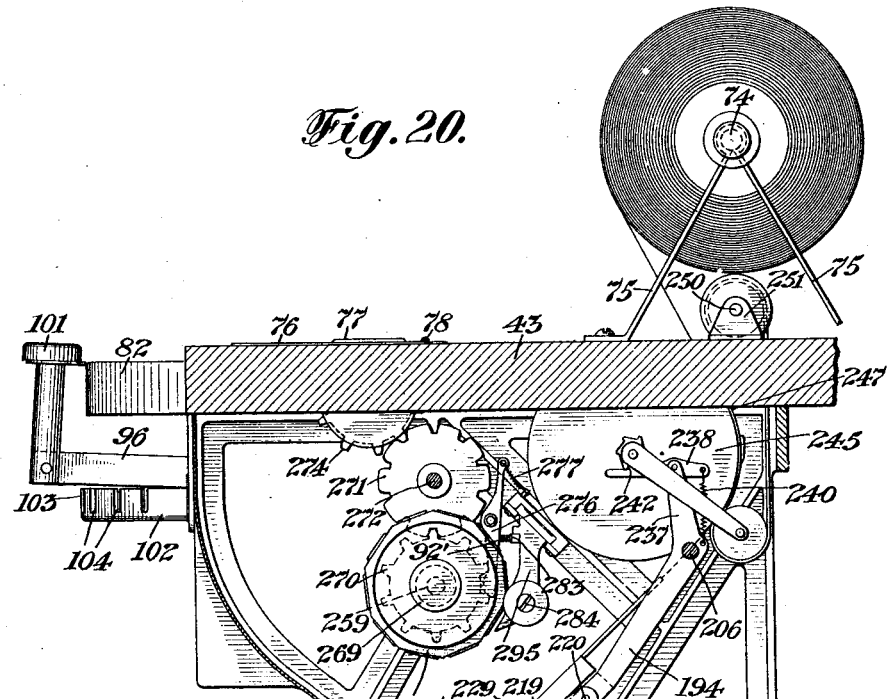
Fig. 20.
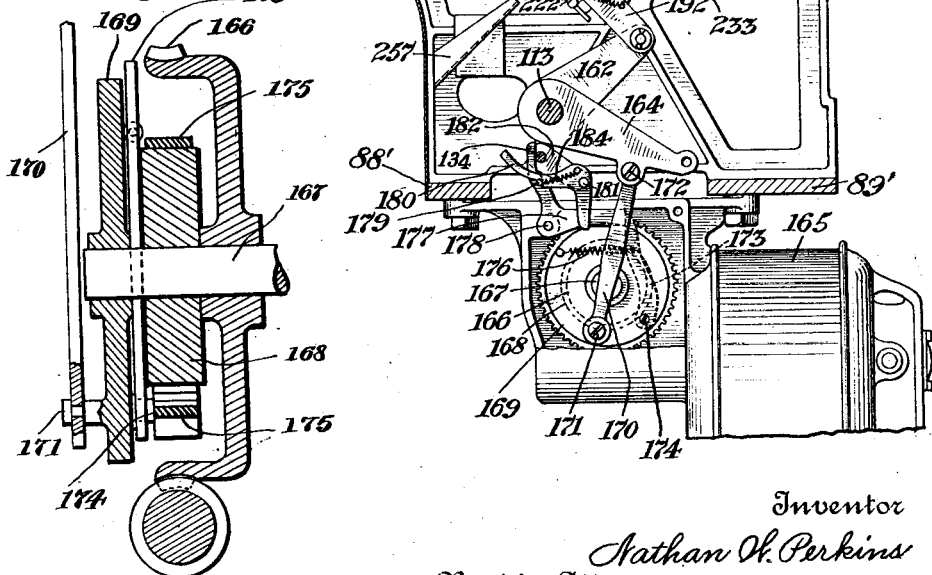
Fig. 20¹
Inventor
Nathan W. Perkins
By his Attorneys

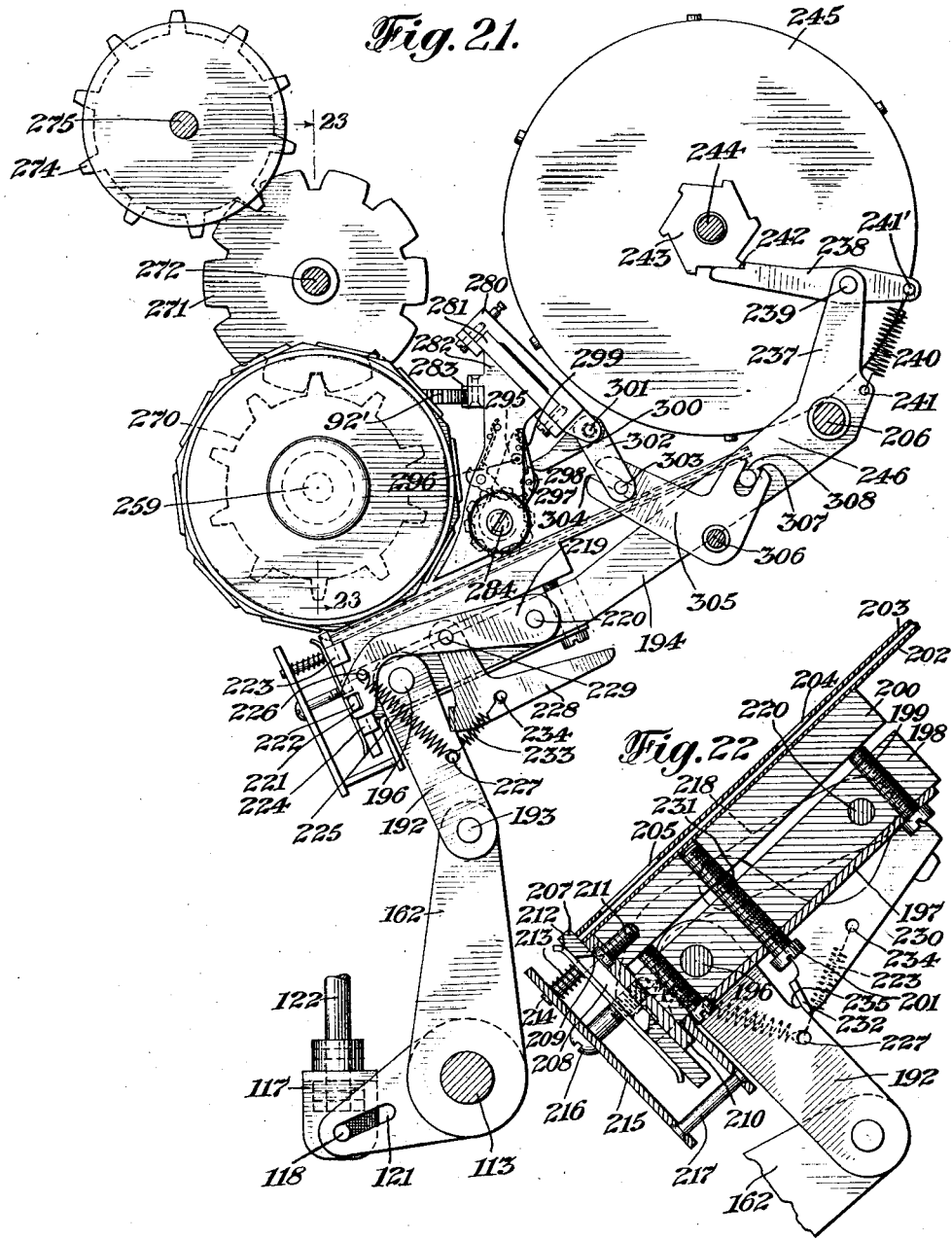

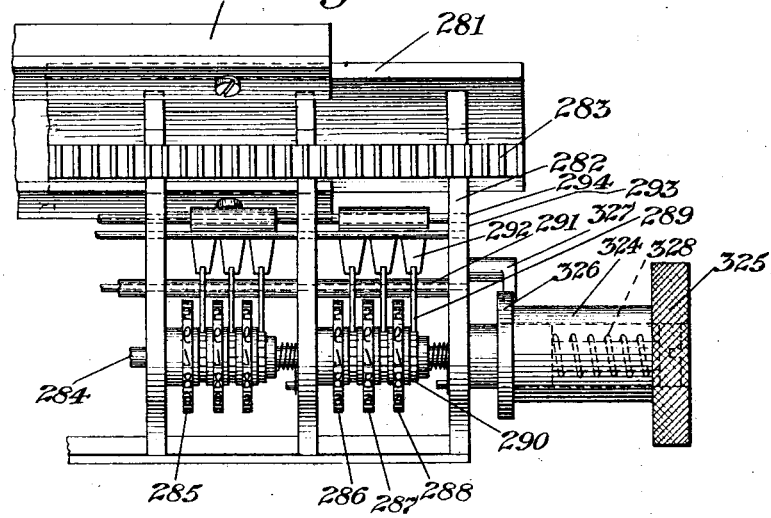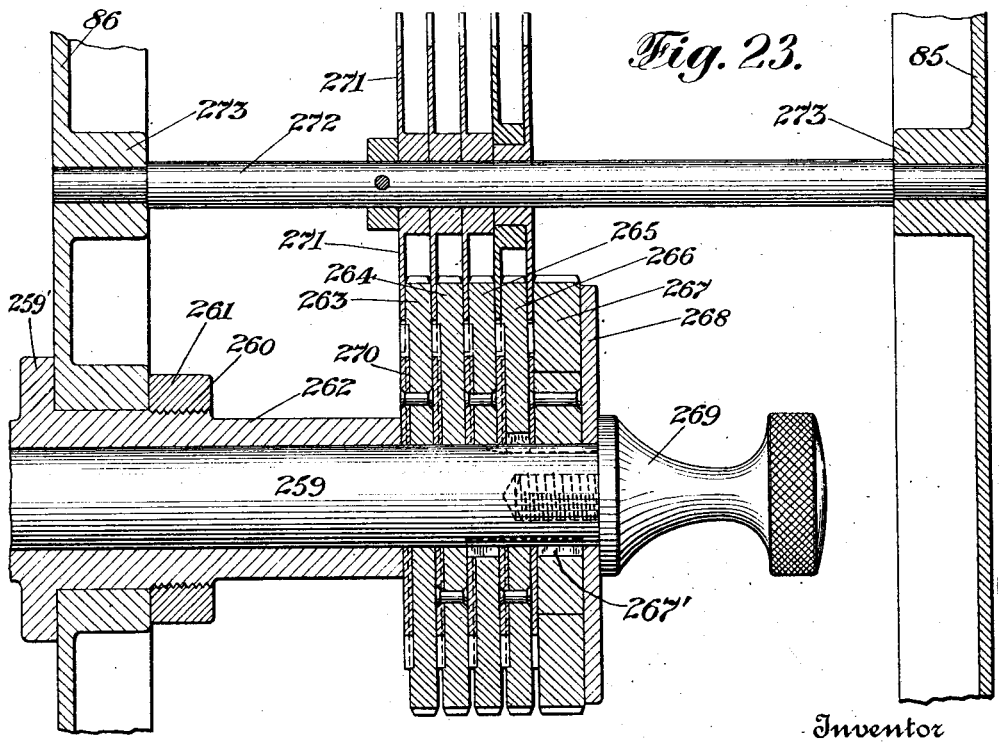

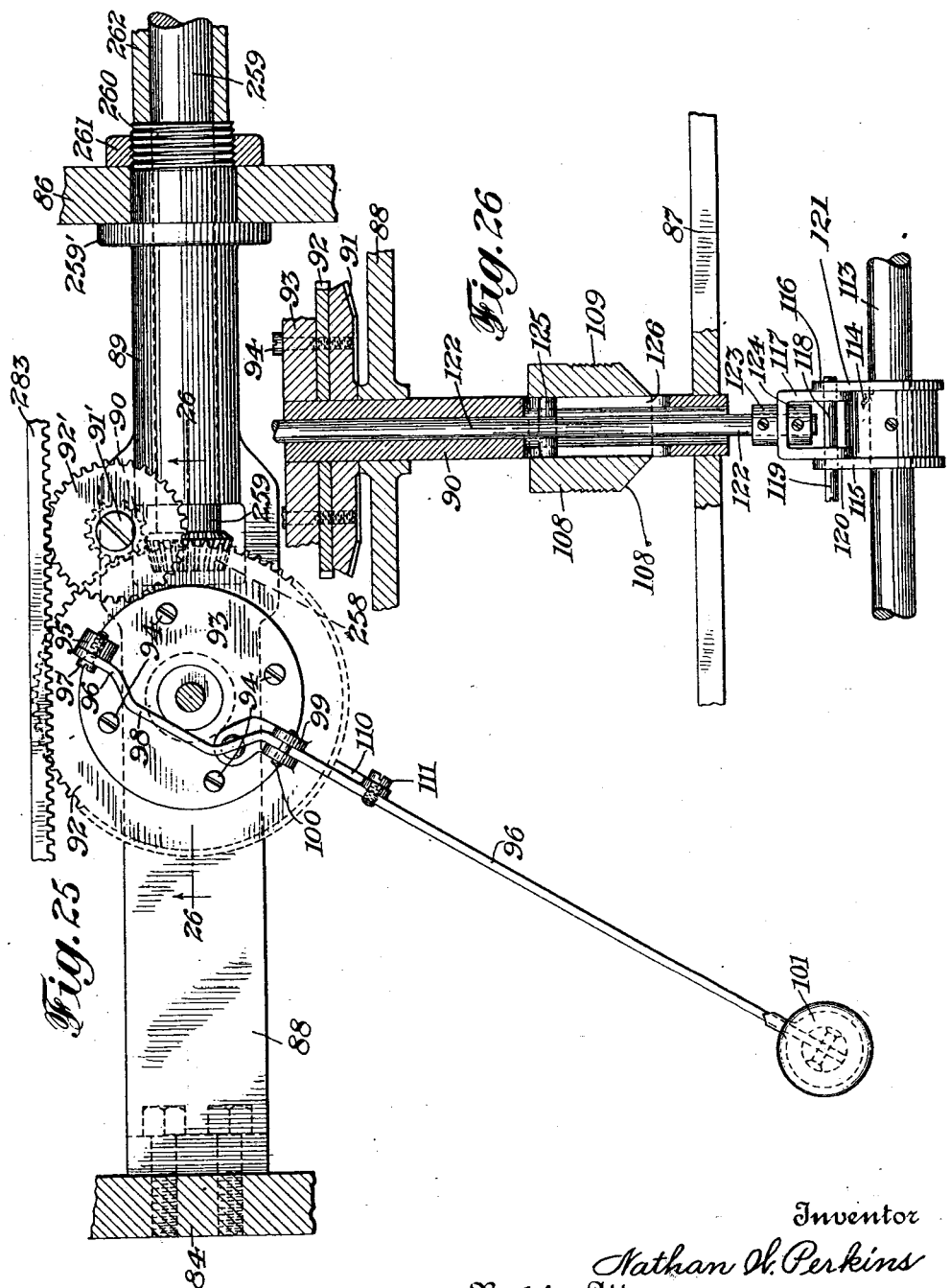

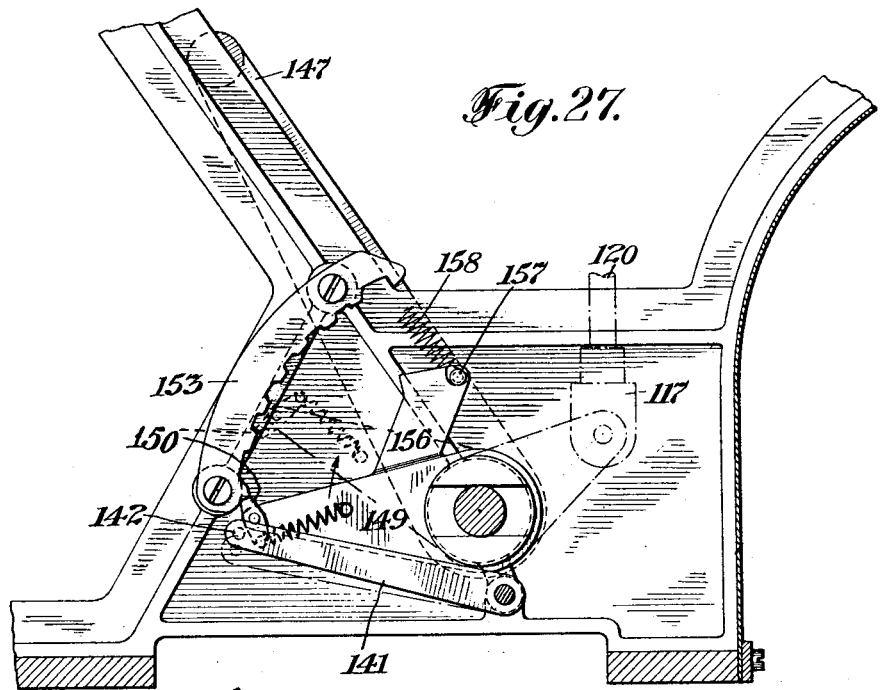
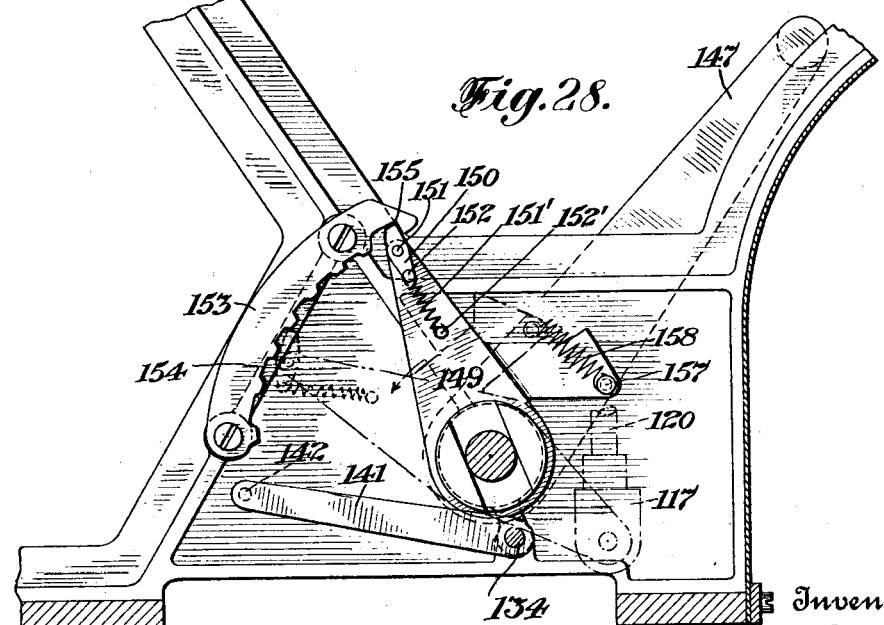

Patented May 29, 1928.

1,671,780

UNITED STATES PATENT OFFICE.

NATHAN W. PERKINS, OF EAST ORANGE, NEW JERSEY, ASSIGNOR OF ONE-THIRD TO CHARLES M. WAITE AND ONE-THIRD TO WILLIS H. BOTSFORD, BOTH OF NEW YORK, N. Y.

TICKET PRINTING, RECORDING, AND INDICATING APPARATUS.

Application filed August 12, 1921. Serial No. 491,876.

This invention relates to an improvement in ticket printing, recording and indicating apparatus, and more particularly to that type of such apparatus as has been employed in the use of printing wager tickets at race courses and similar places. I am aware that heretofore machines have been employed for printing tickets at race courses at which the so-called "mutual system" of wager tickets has been in use. In all these machines, however, so far as I am aware, it has been necessary to print a series or strip of tickets independently for each horse in each race, and in the operation of the machines the tickets have been numbered consecutively for those used for wagers on each horse in any particular race. Obviously, this necessitated printing sufficient tickets to supply what demand there might be for any horse in any race, requiring the same number of tickets to be printed in each instance and also a strip of tickets for every horse in every race. This, obviously, is a method which resulted in considerable waste in unused tickets, as well as an excessive and unnecessary expenditure for printing tickets which are not used. Furthermore, in this type of machine, as commonly employed, no devices have been arranged for preventing the operator from tampering with the machine, and the principal objects of my invention are to overcome these difficulties, providing an apparatus by which tickets from a single strip of tickets the required wager tickets may be printed for every horse in every race in a given meet, and to also record the number of tickets wagered on every horse in every race, together with the total number of tickets which are thus wagered as well as the total amount expended for the wagers in any race, and also the amount expended in wagers on every horse in every race. The invention also includes devices for preventing the operator from tampering with the machine, and furthermore provides printing on the ticket an independent and distinctive character which will lend authenticity to the ticket and provide a means of identification for the same. These and other advantages of the machine made in accordance with my present invention will be hereinafter more particularly described.

In the drawing:

Figure 1 is a front elevation of the ticket printing, recording and indicating apparatus made in accordance with my present invention.

Fig. 2 is a rear elevation of the same.

Fig. 3 is a longitudinal section of the apparatus.

Fig. 6 is an enlarged rear elevation showing the recording devices and the devices for indicating on the board, which forms a part of the superstructure of the machine, the numbers used to designate each horse in any particular race.

Fig. 7 is a sectional elevation on line 7—7, Fig. 6.

Fig. 8 is a partial sectional elevation on line 8—8, Fig. 6.

Fig. 9 is a sectional elevation on line 9—9, Fig. 6.

Fig. 10 is a view similar to Fig. 9 showing the name holding cards in an open position.

Fig. 20 is a sectional elevation on line 20—20, Fig. 15.

Figure 5:
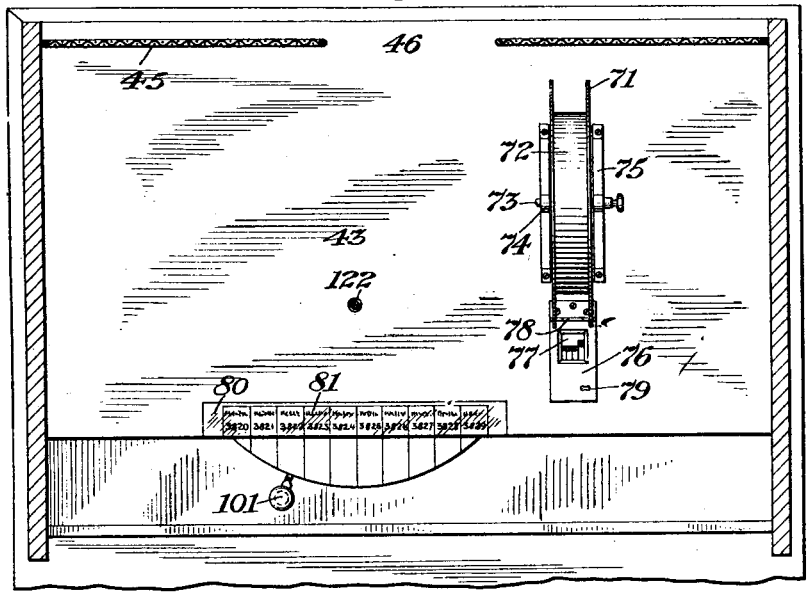
Fig. 5 is a sectional plan taken on line 5—5, Fig. 4.

Fig. 20' is a section on an enlarged scale of the clutch mechanism taken at right angles to the position of these parts as illustrated in Fig. 20.

Fig. 21 is a sectional elevation on a still larger scale illustrating the printing apparatus and the devices for feeding the tickets.

Fig. 22 is an enlarged cross section showing the construction of the ticket carriage for moving the tickets to the type wheels for the printing operation.

Fig. 23 is an enlarged cross section showing the printing wheels, together with the wheel for printing the distinctive character on each ticket.

Fig. 24 is an elevation showing two of the devices for printing the serial numbers of the tickets.

Fig. 25 is an enlarged plan and partial cross section showing the selecting lever and the parts operated thereby.

Fig. 26 is a sectional elevation taken on lines 26—26, Fig. 25.

Fig. 27 is a sectional elevation showing the ratchet and locking mechanism.

Fig. 28 is a view similar to Fig. 27 showing the operating parts in the reversed positions.

Fig. 29 is an elevation and partial cross section showing the joint in the rod for operating the indicating counters.

Fig. 30 is an elevation showing the same parts with the collar and lock removed so that the shaft may be separated, and Fig. 31 is a plan of one of the tickets printed by the apparatus.

Referring to the drawings, it will be seen that in carrying out the invention the apparatus made in accordance therewith includes a base 40 with which there may be associated a suitable platform 41 upon which the operator may stand. There is also included a case 42 for containing the operating mechanism which is preferably connected in a suitable manner to a table 43 from which the tickets may be sold. Above the table 43 there is a cage or compartment 44, the front of which may be made of coarse mesh wire as indicated at 45 in which there is an opening or window 46, and above the cage or compartment there is a superstructure 47 for a purpose hereinafter described. The outer member of the superstructure is preferably a board or sheet metal member 48 comprising a face in which, in one side, there are openings or slots indicated at 49 to 59 inclusive. The opening 49 is used to designate the number of the race by displaying the number through the opening. The opening 50 as well as the openings 51 to 59 are used to designate the number assigned to each horse in the race indicated, as well as the name of the horse, assuming, of course, that there are, as usual, only nine horses named in each race as a maximum number and all above which are included as the "field" as indicated in the opening 59 by the number which appears therein. On the opposite side of the indicator board a series of openings 60 to 70 are employed to designate the total amount of money used to purchase wager tickets in the use of the machine for any particular race as well as the amount of money so wagered on each horse named in the race as well as on those included in the field, the opening 60 being used to designate the total and the openings 61 to 69 the nine horses which may be in a race, while the opening 70 is used to designate the amount wagered on the field.

It is to be understood that the apparatus herein described is so constructed, and the indicators to which reference has hereinbefore been made are so provided with numerals that in the use of the machine by issuing tickets at a predetermined price in unit denominations the total amount paid for tickets of any number is indicated, and also the total amount paid for all tickets issued from the machine.

In the cage or compartment 44 a reel 71 is mounted upon an axle 73 journaled in suitable bearings 74 which are carried by brackets 75, these brackets being suitably connected to and supported upon the table 43. Also upon the table 43 there is a cover 76 which is hinged, as indicated at 78, and is provided with an opening 77 through which one of the wheels for operating a type wheel projects and is locked when the cover plate is fixed in position by a latch lock or otherwise, the keyhole for which is indicated at 79 in the cover plate.

Also in the table 43 and adjacent the inner edge thereof there is set a strip of plate glass 80 over a pocket 81. This pocket 81 is adapted to receive a strip of paper on which there is printed the name and the number assigned to each horse in any particular race. Adjacent that portion of the front of the table in which the glass plate 80 is set the same is provided with an extension 82, preferably in circular form, on the face of which there are divisions 83 designated consecutively from zero to nine to indicate respectively the number of a horse in any race and to include the horses designated as "the field".

Secured to and preferably depending from the table 43 there is a machine frame in which the operating parts of the mechanism are mounted. This machine frame, as illustrated, comprises the outer members 84 and 85 and a relatively similar intermediate member 86 which are connected by a bracket 87 extending between the members 85 and 86 and a cross and bearing bar 88 and 89 also extending between the members 84 and 86 as well as base rails 88', 89' extending beneath and connected to the members 84, 85 and 86 which, at their upper ends, as will be understood, are suitably secured to the table 43 so as to be suspended therefrom.

Journaled in and extending between the cross bar 88 and the bracket 87, there is a tubular shaft 90. This tubular shaft 90 extends an appreciable distance above the cross bar 88, and fitted thereon is a bevel gear 91, a spur gear 92 and a disk 93, which parts, that is the bevel gear, the spur gear and the disk, are suitably connected by means of screws or bolts 94. Extending from the disk 93 and preferably made integral therewith is an arm 95. At the outer end of this arm a lever 96, hereinafter termed, the selecting lever, is pivotally connected as indicated at 97. This selecting lever 96 is offset as indicated at 98, (see particularly Fig. 25) and then extends between guide arms 99 in which there is a stop pin 100 to limit and determine the position of the selecting lever. This selecting lever passes from the frame of the machine to a point beyond the inner edge of the extension of the table where the lever is fitted with a handle 101 by which it may be operated. Connected to the rear parts of the machine and beneath the extension 82 on the table 43 there is a bracket 102. This bracket 102 has a circularly disposed flanged extension 103 corresponding in its curvature to the extension of the table and in which there is a series of notches 104 corresponding in number and in position centrally disposed to the divisions on the face of the extension table and in any one of which notches, after being turned to the necessary position, the selecting lever may be caused to enter by depressing the same. The selecting lever is preferably maintained in an upwardly disposed normal position by means of a button 105 operating in a boss 106 against the action of a spring 107 by means of which the outer end of the button is caused to bear against the under and adjacent surface of the selecting lever 96 to maintain the same normally in this position. On the tubular shaft 90 there is slidably mounted a collar 108 having in the surface thereof a series of circumferential notches indicated at 109. This collar 108 is connected to the selecting lever by a rod 110 that at one end is pivotally secured to the selecting lever as indicated at 111 and at the opposite end is engaged in a notch provided therefor in the collar 108 to which this end of the rod is connected by a pivot pin 112 in order that by depressing the selecting lever 96 the collar 108 may be caused to slide downwardly on the tubular shaft for purposes hereinafter described.

Suitably journaled in bearings provided therefor in the frame members 84, 85 and 86 is a power shaft 113. This is furthermore secured in position by collars 113', 113² fixed on the power shaft and made to bear against the frame members 84, 86 respectively or otherwise. On the power shaft 113 there is fixed a collar 114. This collar carries crank arms 115 and 116 which are connected to a yoke member 117 by means of a pin 118 or otherwise, and as indicated in the drawing one end 119 of the pin 118 extends an appreciable distance beyond the crank arm 115 for a purpose hereinafter described. The pin 118 is journaled in the arms of the yoke 117 and passes through slots 120 and 121 in the crank arms 115 and 116 respectively so that when the power shaft 113 and the crank arms 115 and 116 are partially turned the pin 118 is caused to slide in the slots 120 and 121 to move the yoke 117 vertically. 122 indicates a vertical shaft, the lower end of which passes through a bearing provided therefor in the cross member of the yoke 117 and on this shaft there are fixed collars 123 and 124, the former immediately above the cross bar of the yoke 117 and the latter immediately beneath the same so as to transmit the reciprocating movement imparted to the yoke 117 to the shaft 122. This shaft 122 extends upwardly through the tubular shaft 90 in which, adjacent the lower end thereof, there are oppositely disposed longitudinal slots 126. Passing through the shaft 122 and extending into the slots 126 is a pin 125 which, as the shaft 122 is reciprocated, slides in the slots 126. It will be understood that the disk 93 and the spur gear 92, as well as the bevel gear 91, while being secured to one another by the bolts 94, are also secured to the tubular shaft 90 so that as the disk and gears are turned they also turn the tubular shaft 90 which transmits this turning movement to the shaft 122 by means of the pin 125 acting against the faces which define the slots 126.

Figure 18:
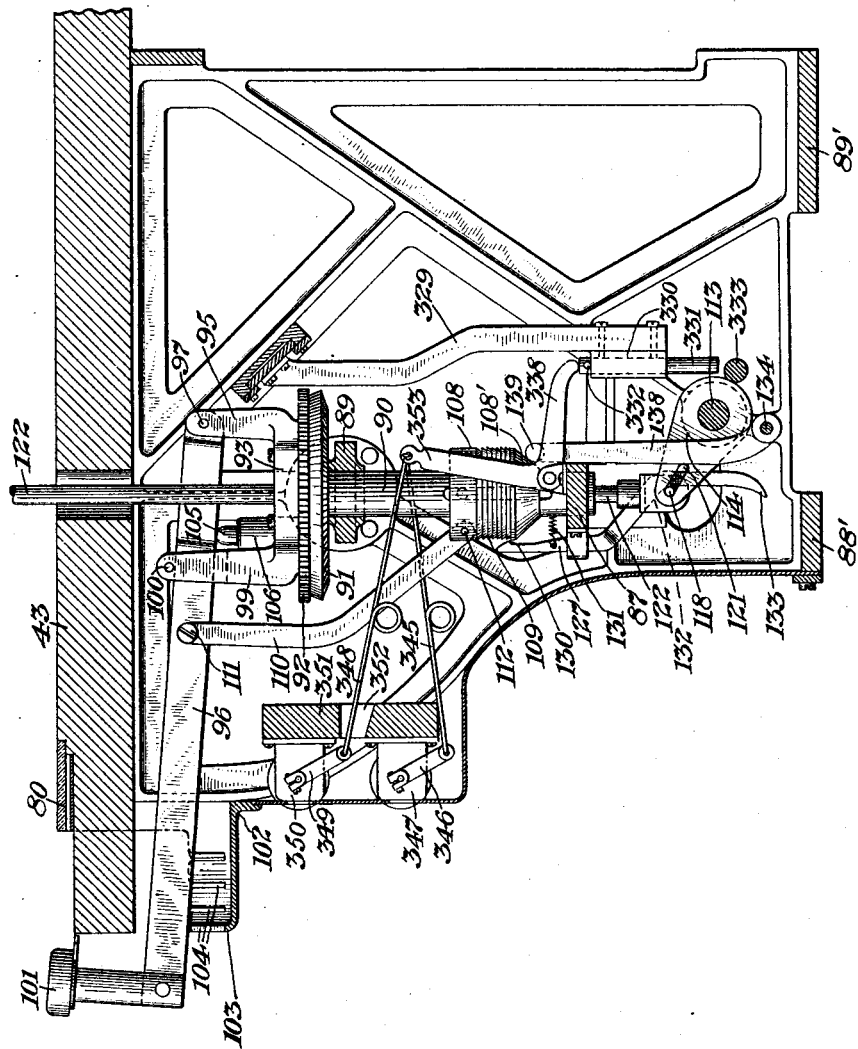
Fig. 18 is a sectional elevation taken on line 18—18, Fig. 15.

The lever 127 is pivotally mounted as indicated at 128 in a bracket 129 secured to and extending from the bracket 87. The upper end of this lever 127 is provided with a tooth 130 that is adapted to engage the circumferential grooves 109 in the collar 108 and this end of the lever is normally maintained under tension tending to move the tooth 130 into engagement with one of these notches by means of a spring 131 or otherwise. The opposite end of the lever 127 is offset both laterally and inwardly and terminates in a contact portion 132 at the extremity of which there is a hook 133. This contact portion 132 of the lever 127 is normally maintained against the extending end 119 of the pin 118 by means of the spring 131 so that the tooth 130 is out of engagement with the circumferential grooves 109. When, however the power shaft 113 is given a partial counter clockwise movement as viewed in Figs. 18 and 19 the crank arms 115 and 116 swing downwardly, moving the pin 118 in the slots 120 and 121 and permitting the action of the spring 131 to move the lever 127 so that the tooth 130 at the upper end thereof may engage and be maintained in engagement with one of the circumferential grooves 109 until the swinging movement of the crank arms 115 and 116 is sufficient to bring the pin 118 into that position in which the end 119 thereof will contact with the lower end of the lever 127 to move the same against the action of the spring and the tooth out of engagement with the groove so as to free the collar 108, thereby permitting the same, together with the selecting lever 96, to return to their normal position through the action of the spring 107 and the button 105.

I also employ a rocker shaft 134 passing through and journaled in bearings in the frame members 84, 85 and 86 as well as in an auxiliary bearing 134' supported from the base. On this rocker shaft there are collars 135, 136 suitably secured thereto and carrying arms 137, 138 respectively which, at their outer ends, are connected by a cross roller 139. This cross roller normally contacts with the surface of the tubular shaft 90 beneath the collar 108, and a conical surface 108' at the lower end of the collar 108 is adapted to bear against the cross roller 139 when the collar is moved downwardly on the tubular shaft 90 so as to swing the arms 137 and 138 to impart a partial revolution to the rocker shaft 134.

On the rocker shaft 134 adjacent and preferably bearing against the frame member 85 there is fixed a collar 140. This collar carries a lever arm 141 at the end of which there is a pin 142. The rocker shaft 134 is almost immediately beneath the power shaft 113 and on the power shaft 113 there is a sleeve 143 which is preferably journaled in a bearing provided therefor in the frame member 85 and in which the power shaft at this end thereof is journaled. This sleeve 143 at its inner end is provided with a notch 144 adapted to be engaged by a rib 145 on a clutch sleeve 146 which is mounted on the power shaft 113 in such a manner as to turn therewith and also to slide thereon. Exteriorly of the frame member 85 the sleeve 143 is fitted with a lever 147 carrying a handle 148 by which, when the clutch sleeve 146 is in engagement with the sleeve 143 the power shaft may be operated manually. On the sleeve 143 immediately within the frame member 85 there is connected a lever 149. This lever is so constructed that normally the lower edge thereof runs substantially parallel with the upper edge of the lever arm 141 when the latter is in its normal position. At the extremity of the lever 149 there is a pawl 150 pivotally connected thereto at 151 and provided with a pin 152 at the inner end thereof, while the outer end of the pawl extends appreciably beyond the end of the lever 149. The pin 152 is connected to a pin 152' in the lever 149 by a spring 151' to normally maintain the pawl in position. Suitably fixed on the inner side of the frame member 85 there is a rack 153 having a circularly disposed edge in which there is a series of notches 154 which, with the exception of the uppermost notch 155, are similarly placed in the edge of the rack. The lever 149 is provided with an extension arm 156 in which there is a pin 157, while a spring 158 is connected at one end to the pin 157 and at the other end to a suitable attachment in the frame of the apparatus so as to normally maintain the lever 149 in the position shown in Fig. 27 of the drawing. In this position the parts are locked and the manually operated lever 147 cannot be actuated because the pin 142 at the outer end of the lever 141 bears against the lower edge of the extending portion of the pawl 150 and maintains the upper edge of the pawl against the lower edge of the rack 153. When, however, the rocker shaft 134 is given a partial revolution by the conical surface 108' of the collar 108 swinging the arms 137, 138 through its contact with the cross roller 139, the lever 141 is swung from the full line position as indicated in Fig. 27 to the dotted line position shown therein, thus freeing the pawl 150 and permitting the movement of the lever 149 by the manually operated lever 147. In so doing, as will be understood, the pawl 150 engages successively in the notches 154 in the rack 153 and cannot return until the pawl reaches the uppermost notch 155. The power shaft actuates the printing platen and the devices associated therewith, as hereinafter described, so that, as will be understood, in operating the mechanism manually these printing devices must be moved to the operating position before they can be returned to their initial inoperative position. It will furthermore be observed that when the collar 108 is depressed and the tooth 130 caused to engage one of the circumferential grooves 109, as hereinbefore described, the collar 108 is thereby locked or prevented from returning to its normal position until the tooth 130 is released and so long as the collar 108 is locked in a depressed position the rocker shaft 134 is turned to that position in which the lever 149 may be operated. Consequently, the selecting lever 96 cannot be returned to an initial position until the parts performing the printing operation have completed the printing of a ticket. When this is accomplished, that is when the power shaft 113 has been turned sufficiently far to release the lever 149, the lever 127 is also released, freeing the collar 108 and thereby the selecting lever 96 and at the same time permitting the lever 149 to return to its normal position by the action of the spring 158 and the parts then assume the position shown in Fig. 27 so that the manually operated devices for actuating the machine are again locked in place.

Figure 15:
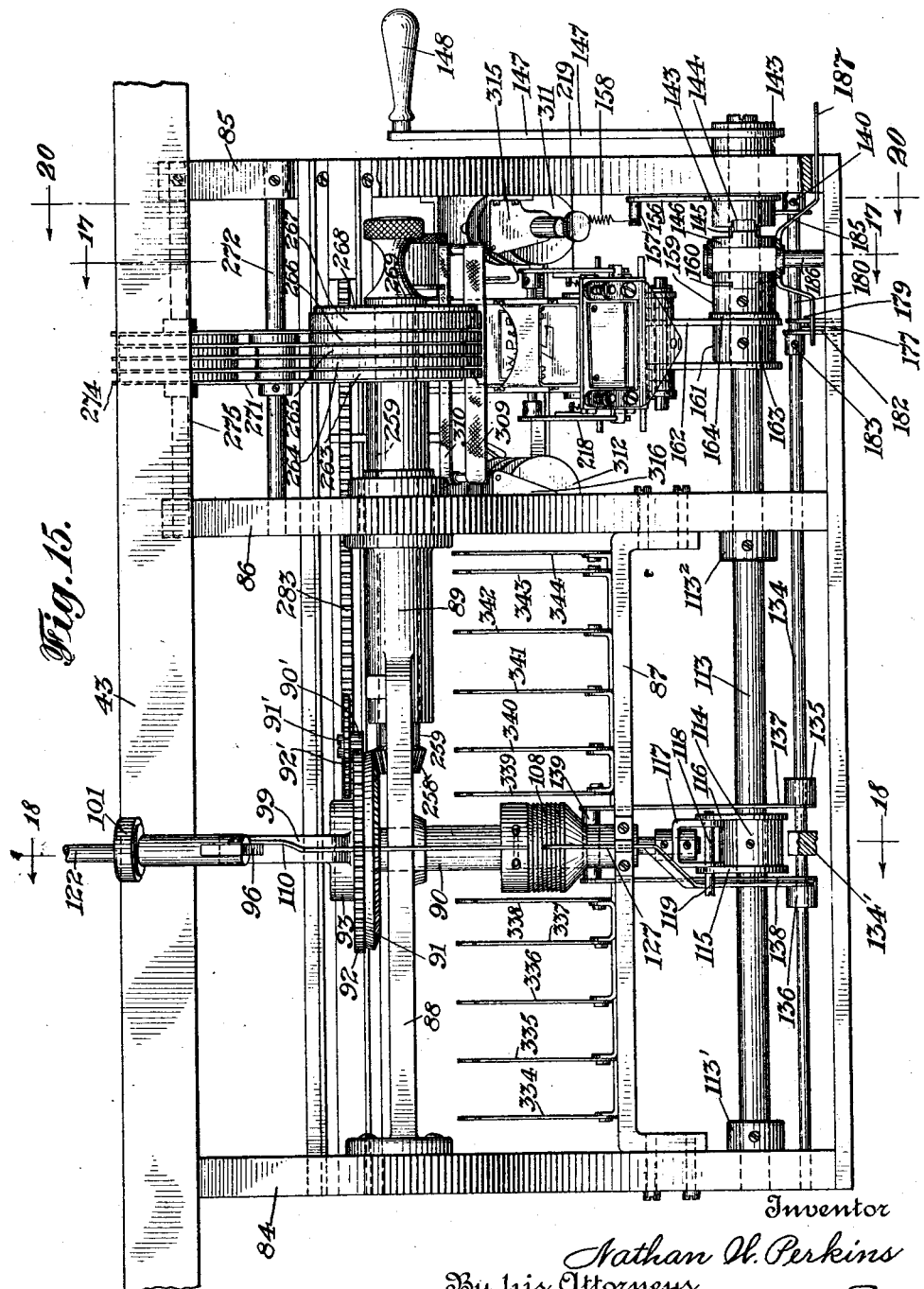
Fig. 15 is an elevation on an enlarged scale taken from the rear of the apparatus showing the means for operating the same.
Figure 16:
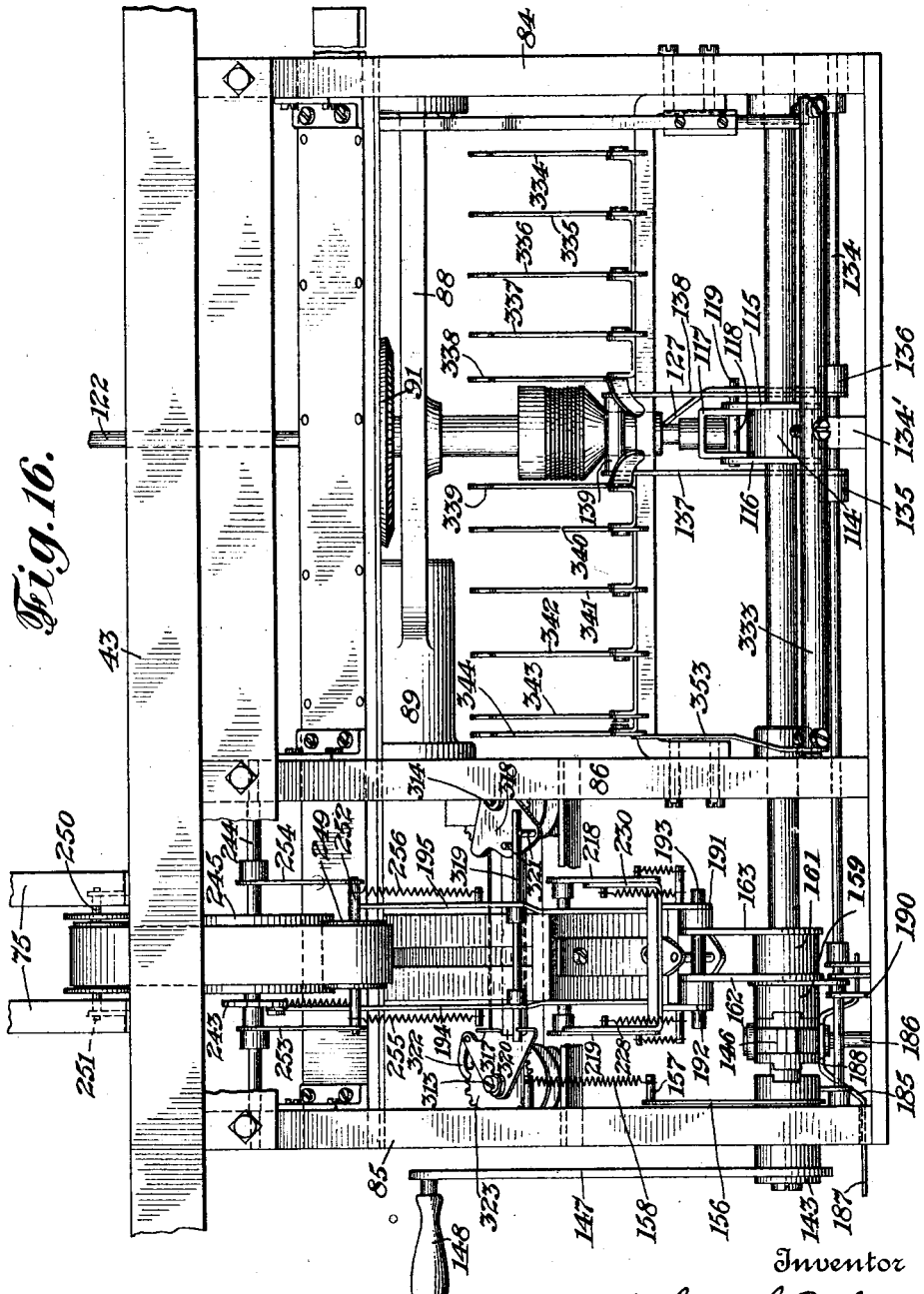
Fig. 16 is a view similar to Fig. 15 taken from the front of the apparatus.
Figure 17:
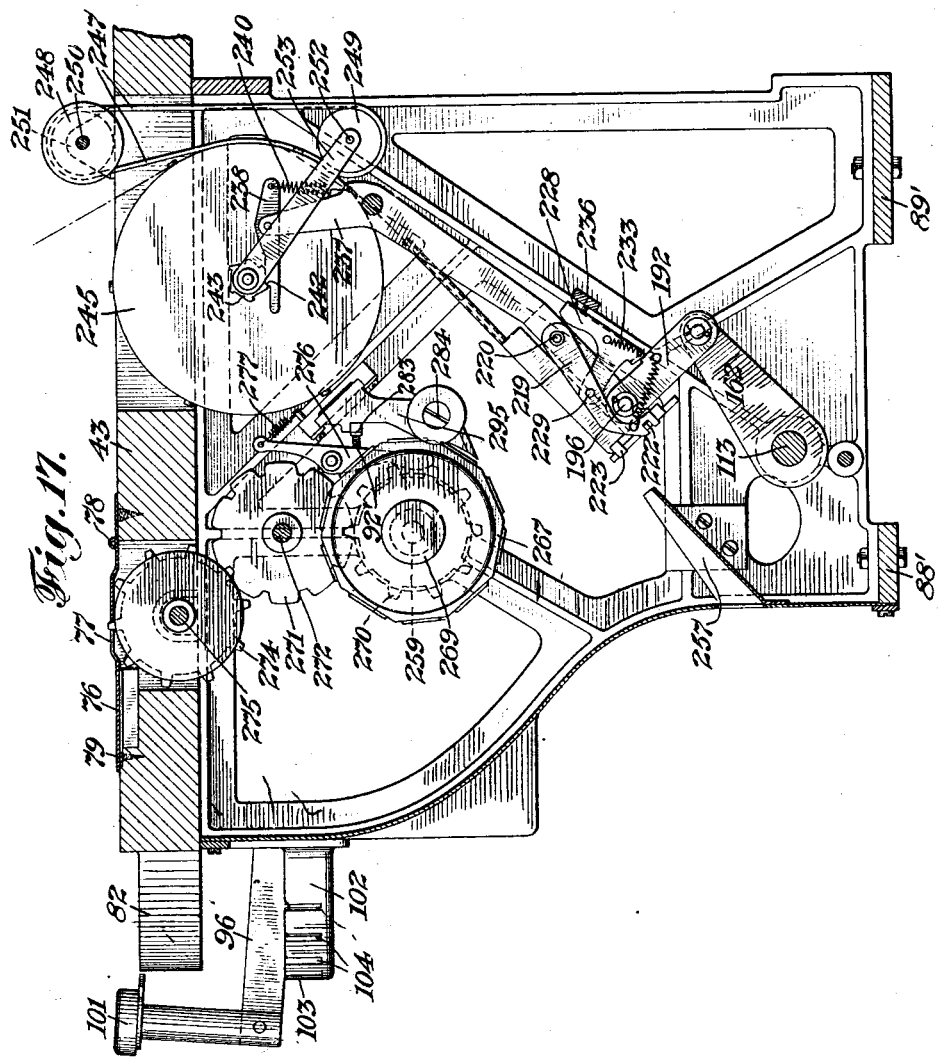
Fig. 17 is a sectional elevation taken on line 17—17, Fig. 15.

The operating devices may also be actuated from a motor or any other suitable source of power. On the power shaft 113 there is mounted to turn a sleeve 159. This is fitted with a recess adapted to receive a rib 160 on the clutch sleeve 146 when in position as shown in Figs. 15 and 16. On the power shaft 113 there is also fixed a collar 161 to which are connected or made integral the crank arms indicated at 162 and 163 employed for operating the printing platen, as hereinafter described. On the sleeve 159 there is a crank arm 164 to which the driving mechanism actuated by the motor is connected. The motor is indicated at 165 and the motor shaft carries a suitable worm gear, see Fig. 20, for driving a gear 166 which is mounted on an auxiliary shaft 167 to which there is fixed a drum 168. Loosely mounted on the shaft 167 is a disk 169, and this disk is connected to the crank arm 164 by a rod 170, the rod 170 at one end being pivotally connected to the disk as indicated at 171 and at the other end to the crank arm 164 as indicated at 172. A lever 173 is pivotally connected to the disk 169 and carries a band bar 174 which extends across the drum 168. The band 175 which is operated by the band bar 174 extends over the drum 168 so that when the lever 173 is operated to actuate the band bar the band is drawn tight about the drum which causes the disk 169 to revolve and in revolving to move the rod 170 to actuate the crank arm 164 and thereby impart a partial revolution of sufficient extent to the power shaft to operate the mechanism. As clearly indicated in Fig. 20 the upper end of the lever 173, by means of a spring 176, is normally maintained against the extremity of one arm of a bell crank lever 177 which is pivoted in the motor frame as indicated at 178. The other end of this bell crank lever 177 is provided with a pin 179 and normally rests against the rocker shaft 134. A lever 180 is pivotally connected at 181 to a crank arm 182 that is secured to a collar 183 fixed on the rocker shaft 134 and the lever 180 is provided with a notch adapted to engage the pin 179 on the lever 177 when the parts are normally in the position shown in Fig. 20 by means of a spring 184.

The clutch sleeve 146 is actuated by a clutch lever 185 mounted in a post 186 fixed in the frame of the machine. The clutch lever has an arm 187 extending exteriorly of the frame so as to be readily accessible for operating the clutch. It also has an arm 188 connected to the collar 189 surrounding the clutch sleeve and by which the same is operated. The clutch lever also includes an arm 190 which extends to such a position as to engage with the upper end of the lever 180. Now, as will be understood, when the clutch is in the position shown in Figs. 15 and 16 in which the apparatus is operated by the motor the arm 190 of the clutch lever is out of contact with the lever 180 so that the trip mechanism shown in Fig. 20 is free to operate. Assuming, therefore, that the motor is running, the parts are normally in their positions as indicated in this figure. When, however, the mechanism is to be operated the rocker shaft 134 is turned, as hereinbefore described, and in so turning the arm 182 is swung to move the lever 180 and causing the same, through its contact with the pin 179, to swing the lever 177, freeing the extremity thereof from the lever 173. This permits the spring 176 to draw the lever 173 sufficiently far to tighten the band 175 on the drum 168 thereby causing the disk 169 to revolve and in revolving to operate the crank arm 164 to actuate the platen of the printing devices. It will be understood, that one complete revolution of the disk 169 is sufficient to answer this purpose, and when this revolution has been completed the free end of the lever 173 again contacts with the extremity of the lower arm of the bell crank lever 177 thereby freeing the band and permitting the motor to run without actuating the disk 169. This contact of the lever 173 with the extremity of the lower arm of the bell crank lever 177 is possible because of the fact that the continued motion of the shaft 134 and the arm 182 releases the pin 179 in the bell crank lever 177 from the notch in the lever 180 and permits the bell crank lever to return immediately to its normal position. When, however, it is desirable or necessary to operate the apparatus manually, and in so doing to swing the clutch sleeve to the opposite position to that shown in Figs. 15 and 16 so that the same will engage the sleeve 143, the clutch lever will be turned to such a position that the end 190 thereof will contact against the upper end of the lever 180 thereby causing the same to be raised sufficiently far to permit the notch in the lever to be free from the pin 179 fixed in the lever 177 in order that in this position, when the rocker shaft 134 is moved, its movement, together with the movement imparted thereto by the arm 182 will in no way affect the lever 177 so that with the parts in this position it will be immaterial whether the motor is running or not when the mechanism is manually operated.

The printing apparatus includes a platen which is carried by swinging lever arms connected to the crank arms 162 and 163 by the links 191 and 192. The corresponding ends of these links 191 and 192 are connected to the outer ends of the crank arms 162 and 130

163 by a shaft 193, and the opposite ends of the links 191 and 192 are connected to the swinging levers 194 and 195 by a shaft 196, and the levers 194 and 195 are pivotally mounted on a shaft 206 which is connected in the frame members 85 and 86. With the parts in their normal positions, as indicated in Fig. 22, the levers 194 and 195 are materially spaced from the type wheels hereinafter described, and when the power shaft 113 is moved a partial revolution the crank arms 162 and 163 are moved from the position shown in Fig. 22 to that shown in Fig. 21 to impart a swinging movement through the levers 191 and 192 to the links 194 and 195 causing the same to move to the position shown in Fig. 21 which is the printing position.

Suitably connected to the levers 194 and 195 is a platen base 197 and a lower bed plate 198, which parts may be connected by the adjusting screws 199 or otherwise. Immediately above the bottom or lower bed plate 198 and adjustably spaced therefrom by the screws 199 is in an upper or outer bed plate 200. This is secured in position against the adjusting screws 199 by a bolt or screw 201 or otherwise. Carried upon the outer face of the upper bed plate 200 is an inner guide plate 202, and suitably spaced therefrom is an outer guide plate 203. In this outer guide plate there is an opening 204 and also an opening 205 through which the type wheels hereinafter described pass to print the ticket in the desired manner. At the lower or forward end of the plates 198 and 200 is a knife 207. This preferably comprises a plate having an opening 208 therein, one of the edges 209 defining the opening being a cutting edge. This knife plate 207 is adapted to bear against a plate 210 secured in the upper bed plate 200 by a screw 211 or otherwise, and the knife plate is adapted to operate between the bearing plate 210 and a yieldingly supported plate 212 by means of springs 213 surrounding posts 214 and extending between the yielding plate 212 and a front plate 215 which may be secured in position by means of the screws 216 and the posts 217 or otherwise.

The knife plate 207 is operated by levers 218 and 219 mounted on a shaft 220 which passes through the levers 194 and 195 and also through the inner bed plate 198. The outer ends of these levers 218 and 219 are each provided with a recess 221 to engage a lug 222 extending from the side of the knife plate 207 which is guided in its movement by the bearing members 223 and 224, these parts being normally maintained in the positions shown in Figs. 20 and 22, for example, by means of springs 225 extending between pins 226 on the levers 218 and 219 and pins 227 on the levers 191 and 192. The links 218 and 219 are actuated by bell crank levers 228 and 230. The bell crank lever 228 is pivotally connected to the lever 219 by a pin 229 and the bell crank lever 230 is similarly pivoted to the lever 218 by a pin 231. These bell crank levers 228 and 230 carry a cross bar 232 which is adapted to bear against the adjacent edges of the levers 191 and 192, and these bell crank levers are normally maintained in position with the cross bar 232 in contact with the edges of the links 191 and 192 by means of springs 233 which extend between the pins 227 and suitable pins 234 connected to the bell crank levers. In the corresponding edges of the links 191 and 192 there are notches or recessed portions 235, and in the frame of the machine there is a stop member 236.

At the upper end of the swinging lever 194 there is an arm 237 extending appreciably above the shaft 206 and in which a lever 238 is pivotally mounted as indicated at 239. One end of this lever 238 is connected by a spring 240 to the lever 194, one end of the spring 240 being secured in an aperture 241 in the said lever 194 and the other on a pin 241' on the end of the lever 238. The opposite end of the lever 238 is provided with a notch 242 adapted to engage the teeth of a ratchet 243 which is mounted on a shaft 244 carrying a feed drum 245 for feeding the ticket strip 72 from the reel 71 to the position for printing the same between the guide plates 202 and 203. Associated with the feed drum 245 and coacting therewith is an endless belt 247 passing over pulleys 248 and 249. The pulley 248 is mounted on a shaft 250 journaled in suitable brackets 251 secured to the table of the apparatus, and the pulley 249 is mounted on a shaft 252 journaled at the ends of the arms 253 and 254 which, at their opposite ends, are journaled on the shaft 244 carrying the feed drum 245 so that the tendency of the feed drum in being revolved is to move the arms 253, 254 downwardly, imparting a similar movement to the pulley 249 to maintain a tension by the endless belt 247 against the ticket strip which is being fed by the drum 245 this action being increased and made positive by springs 255 and 256 extending between the shaft 252 upon which the roller 249 is mounted and suitable pins provided for this purpose and mounted in the swinging lever arms 194 and 195. Now, as will be apparent from the foregoing when the power shaft 113 is given a partial revolution sufficient to move the crank arms 162 and 163 and the links 191 and 192 from the positions shown in Fig. 22 to those shown in Fig. 21, the swinging levers 194 and 195 are moved from their normal position to the position shown in Fig. 21 in which the ticket in the guide plates 202 and 203 will be in a position for the printing operation, being brought into contact with the type wheels hereinafter described. In this upward movement of the levers 194 and 195 the bell crank levers 228 and 230, by the action of the springs 233, will move into the positions in which the cross bar 232 engages in the recessed portion 235 of the levers 191 and 192, thereby swinging upwardly the levers 218 and 219 and raising the knife plate 217 to such a position that the opening 208 therein will be above the space between the guide plates 202 and 203 which, as will be understood, permits the ticket to be moved through this opening in the knife plate, when, by the return movement of the levers 194 and 195, the shaft 244 is given a partial revolution by means of the pawl lever 238 which is actuated by the arm 237 causing the feed drum to revolve a predetermined portion of a revolution and to feed the ticket strip through the guide plates 202 and 203 an extent representing the length of one of the tickets. After this ticket feeding operation has been completed and as the levers 194 and 195 are returned to their normal positions and just before reaching the same the end of the bell crank lever 228 contacts with the stop 236, disengaging the cross bar 232 from the recessed portion in the adjacent edges of the links 191 and 192 thereby permitting the springs 225 to rapidly return the levers 218 and 219 to their normal position, returning the knife plate to its normal position and cutting the ticket which has been printed from the strip. The ticket thus cut from the strip is delivered to a chute 257 through which it passes to a table or receptacle suitably mounted exteriorly of the operating apparatus and, from which it may be taken by the operator and delivered to the purchaser.

The bevel gear 91 meshes with a bevel gear 258 secured on a shaft 259 journaled in the bearing member 89 of the cross bar extending between the frame members 84 and 86. Adjacent the frame member 86 the bearing 89 is provided with a flange 259' which abuts against the frame member 86, the bearing 89 passing through the frame member and on the opposite side thereof provided with a screw threaded portion 260 adapted to receive a nut 261 by means of which, together with the flange 259', the bearing member is fixed in place in the frame. The shaft 259 on this side of the frame member 86 extends an appreciable distance beyond the reduced end 262 of the bearing 89 and carries a plurality of type wheels. As indicated in the drawing there are five of these type wheels employed. These are designated by the reference characters 263, 264, 265, 266, and 267. On the outer end of the shaft 259 there is a plate 268 which is maintained in position by a knob 269 to maintain the type wheels between the plate 268 and the reduced end 262. The type wheels 263 and 264 are mounted to turn freely on the shaft 259, and the type wheel 265 is connected to the type wheel 267 by a suitable key 267', while the type wheel 266 is preferably connected to the shaft 259 by a key or other suitable means so as to turn therewith. All these type wheels are mounted to turn freely on the shaft 259 with the exception of the type wheel 266 which is keyed to the shaft so as to turn therewith. Each of these type wheels 263 to 267 inclusive has associated therewith a sprocket 277 and each of these sprockets is engaged by a corresponding star wheel 271. The star wheels connected with the type wheels 265 and 267 are fixed on the same hub so that they turn together. All but one of these star wheels 271 are journaled on a shaft 272 fixed at its ends in bearings 273 provided therefor in the frame members 85 and 86. The star wheel 271 connected with the type wheel 266 is journaled on the outside of the hub connecting the star wheels on either side of it. Each of the star wheels 271 except those connected to the type wheels 266 and 267 is engaged and operated by a sprocket 274. A similar sprocket engages that star wheel 271 which is connected with the type wheel 266 and is operated thereby. The star wheel connected with the type wheel 267 is operated through its hub connection with the star wheel connected to the type wheel 265. To each sprocket 274 is secured a disk carrying the numbers from 1 to 9 consecutively so placed as to have the upper figure correspond to the figure to be printed. These sprockets 274 and the disk associated therewith are mounted on a shaft 275 which is secured to the frame members in such a position that the teeth of these sprockets project and the upper portions thereof show through an opening provided therefor in the table 43 so as to lie immediately beneath the aperture 77 in the cover 76 and all but the sprocket for the units wheel are thereby locked in position. Furthermore the type wheel 267 carries the characters. By removing the hand knob 269 and the disk 268 the type wheel 267 may be easily removed from the shaft and the type wheel replaced by another type wheel having different characters thereon, or as will be understood the characters on this type wheel may be removably connected thereto so as to be replaced by others. I may also employ one or more levers 276 normally maintained in position with one end thereof engaging with the teeth of the sprockets 270 and maintained in this position by means of a spring 277 or otherwise. As will now be apparent the type wheels 263 to 266 inclusive are employed to print the numeral indicated at 278 on the ticket as shown in Fig. 31 and the type wheel 267 is employed to print a predetermined character 279 at the same time the numeral is printed to serve as a means of identification. It will now be understood that the unit type wheel 266 is turned by turning the shaft 259 by actuating the selecting lever 96 and thereby turning the bevel gear 91 which meshes with and turns the bevel gear 258 to turn the shaft 259 and that in so doing the type on the unit type wheel are so arranged that the numeral corresponding to the position to which the selecting lever is moved will be brought into place to be printed on the ticket. It will be equally apparent that the tens type wheel 265 may be moved through its star wheel and corresponding sprocket to correspondingly move the character type wheel 267 as may be desired, and also that the hundreds, as well as the thousands type wheel 264 and 263 respectively may be correspondingly moved from their star and sprocket wheels when the cover plate 76 is unlocked and turned on its hinge to make the operation of the sprocket wheels 274 possible.

Suitably connected in the frame members of the apparatus is a slideway 280 adapted to receive a reciprocating carriage 281. Depending from the reciprocating carriage 281 there is a frame 282. Connected to this frame in any suitable manner is a rack 283 which is engaged by the spur gear 92' which is mounted on an arbor 91' which also carries a pinion 90'' that meshes with the spur gear 92 so that through this gearing, when the selecting lever 96 is turned, the spur gear 92 turns the pinion 90'' and through the arbor 91' turns the spur gear 92' to move the rack and the reciprocating carriage in the slideway 280. In the frame 282 there is mounted a shaft 284 on which there is a plurality of sets of type wheels indicated at 285. In this particular machine there are ten sets of the type wheels 285 inasmuch as provision is made for printing only ten successive or predetermined numbers. Each of these sets of type wheels preferably includes three type wheels and but one set of the same will be particularly described as they are all similarly constructed and each set corresponds to one of the distinctive numbers to be printed on the ticket so as to designate the tickets of a given number corresponding to the number assigned to a particular horse in a race with a serial number to indicate the number of tickets issued by the machine corresponding to any particular horse. The type wheels in each of these sets are preferably three in number and are designated by 286, 287 and 288 as indicated in Fig. 24 of the drawing. Each of these type wheels carries a ratchet 290 engaged by a lock pawl 289 to prevent the type wheel from turning in but one direction. Each lock pawl 289 is maintained in position by a spring 292 which is secured in place by passing between rods 293 and 294 secured in the frame or otherwise. Associated with each set of these type wheels there are arms 295 mounted on the shaft 284 and carrying at their outer ends a roller 296 which extends between the same. Each type wheel in each set is also provided with an actuating pawl 297 mounted to turn on a shaft 298 and normally held in position against the ratchet by a spring 299 or otherwise. In order to actuate the arms 295 and the pawl 297 carried thereby when brought to the proper position in the mechanism I employ a trip lever 300. This is mounted on a shaft 301 journaled in bearings provided therefor in the frame 282. Connected to the shaft 301 is an arm 302 extending downwardly from the frame and provided at its lower end with a pin 303. This pin 303 engages in a slot 304 at the extremity of a bell crank lever 305 mounted on a pivot 306 carried by a suitable bracket connected to the frame of the apparatus, while the opposite end of the bell crank lever 305 is provided with a slot 307 with which a pin 308 engages, the pin 308 being connected to and carried by the swinging lever arm 194 of the platen of the printing mechanism. Now as will be understood, after the selecting lever has been turned to the necessary position for printing a desired number and the carriage 282 moved to the corresponding position so that the corresponding set of type wheels 285 are brought into the proper position and when the platen of the printing mechanism is actuated, and while the levers 194 and 195 are being swung upwardly, the pin 308 engaging in the slot 307 causes the bell crank lever 305 to swing in a counter-clockwise direction, as viewed in Fig. 21, so that by the pin 303 engaging in the slot 304 moves the arm 302 in a clockwise direction to swing the trip lever 300 upwardly to raise the arms 295 and the actuating pawls carried thereby, causing the same to engage the next successive teeth on the corresponding set of type wheels 285. Furthermore, that after the levers 195 and 196 are returned to their normal positions the bell crank lever 305 and the arm 302 will be turned in the opposite directions to swing the trip lever 300 downwardly and out of position so that the reciprocating carriage and associated parts may be moved without interference with the trip lever.

Associated with the type wheels 263 to 267 inclusive is an ink ribbon 309 and associated with the sets of type wheels 285 is a ribbon 310. These ribbons are mounted on the roller spools 311, 312 which, respectively, are carried by shaft 313 and 314 journaled in the brackets 315, 316 suitably connected to the platen carrying levers 194 and 195. The shafts 313 and 314 carry plate levers 317 and 318 respectively by which the ribbon feed is effected through a rod 319 carried by the levers 194 and 195 and engaging at one end in a slot 320 between the upturned side of the plate lever 317 and at the other end between pins 321 carried by the plate lever 318 together with suitable pawls and ratchets, one of which is indicated in Fig. 16, the pawl being designated 322 and the ratchet 323.

Figure 19:
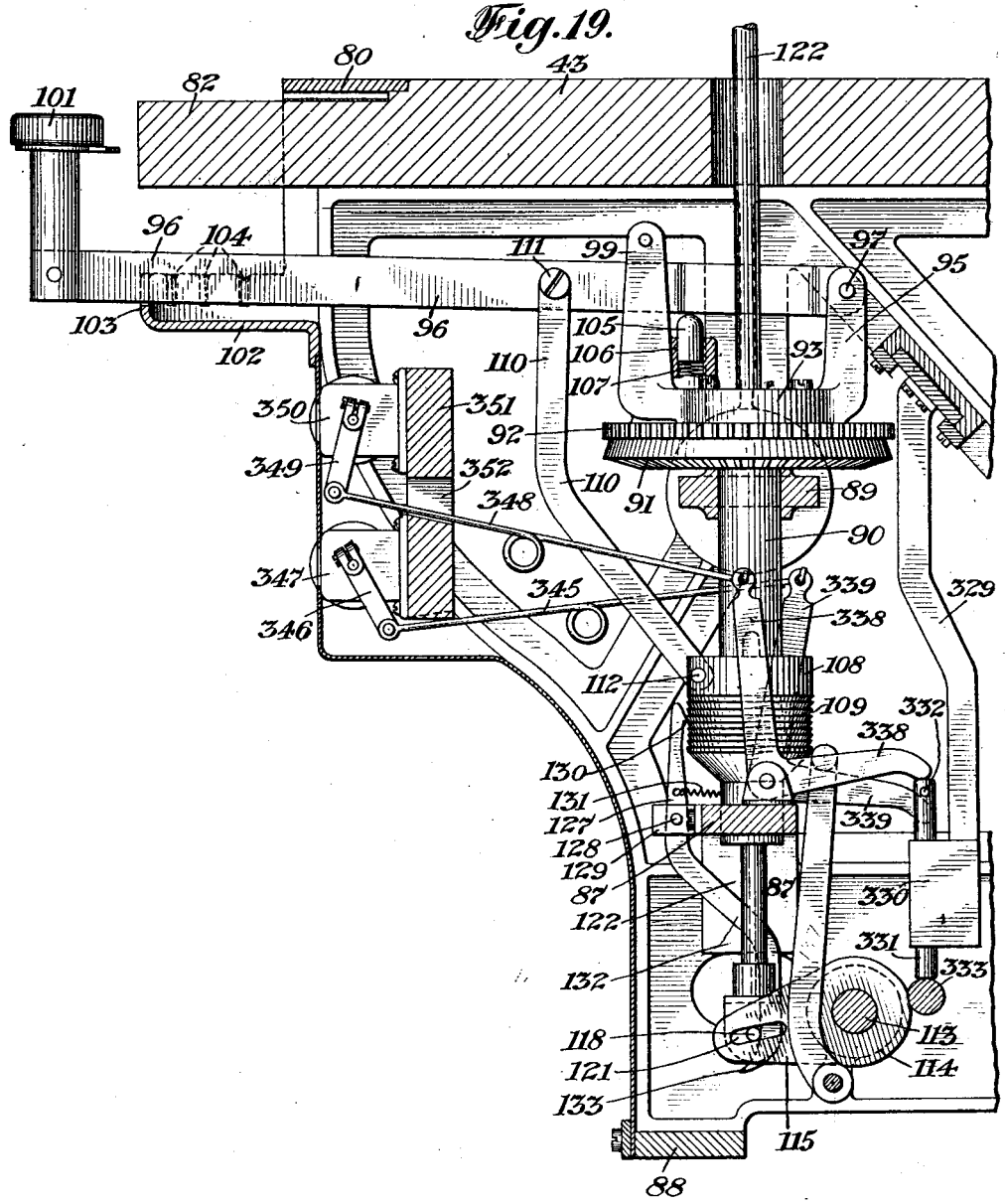
Fig. 19 is a view of the same parts shown in Fig. 18 but on a larger scale and in the opposite position.

Depending from the reciprocating carriage 281 is an arm 329 see Fig. 19. At the bottom of this arm 329 there is suitably secured a bearing 330 in which a plunger rod 331 is journaled, while a pin 332 fixed at the upper end of the plunger rod is employed to prevent the same from falling through its bearing. Suitably connected to the power shaft 113 is a bar 333. The connection between these bars may be made by having the bar 333 connected to collars secured on the power shaft or otherwise and the position of the bar 333 is such that when the power shaft is given a partial revolution it imparts a similar movement to the bar 333 causing the same to contact with the lower end of the plunger rod 331 to raise the same. This plunger rod is adapted to actuate any one of a plurality of levers to operate a series of counters which are preferably of the Veeder type. There is one of these levers for each of the particular predetermined numbers to be printed upon a ticket and a corresponding number of counters, together with an additional lever and counter for making a record of the total number of tickets printed. These levers are indicated at 334, 335, 336, 337, 338, 339, 340, 341, 342 and 343 in Figs. 15 and 16 of the drawing, each lever being pivotally mounted in a suitable bracket and having one arm thereof so extending as to be engaged by the plunger rod 331 when moved to the proper position by the reciprocating carriage. The additional lever 344 is employed to operate the counter used to designate the total number of tickets sold and consequently is operated with each operation of the bar 333. The upper end of each of these levers, taking for example the lever 339 which as shown in Fig. 19 of the drawing is one which has been operated, is connected at its upper end by a spring rod 345 with the lever arm 346 of the corresponding counter 347 and, for example, the next succeeding lever arm 338 is connected at its upper end with a spring rod 348 to a lever arm 349 of the corresponding counter 350. These counters are preferably mounted in superimposed rows on a counter board 351, and the spring rods 345 connecting the lower row of counters to the levers for operating the same preferably pass beneath the counter board while the spring rods 348 connecting the upper row of counters with the corresponding levers pass through openings 352 provided therefor in the counter board.

Figure 4:
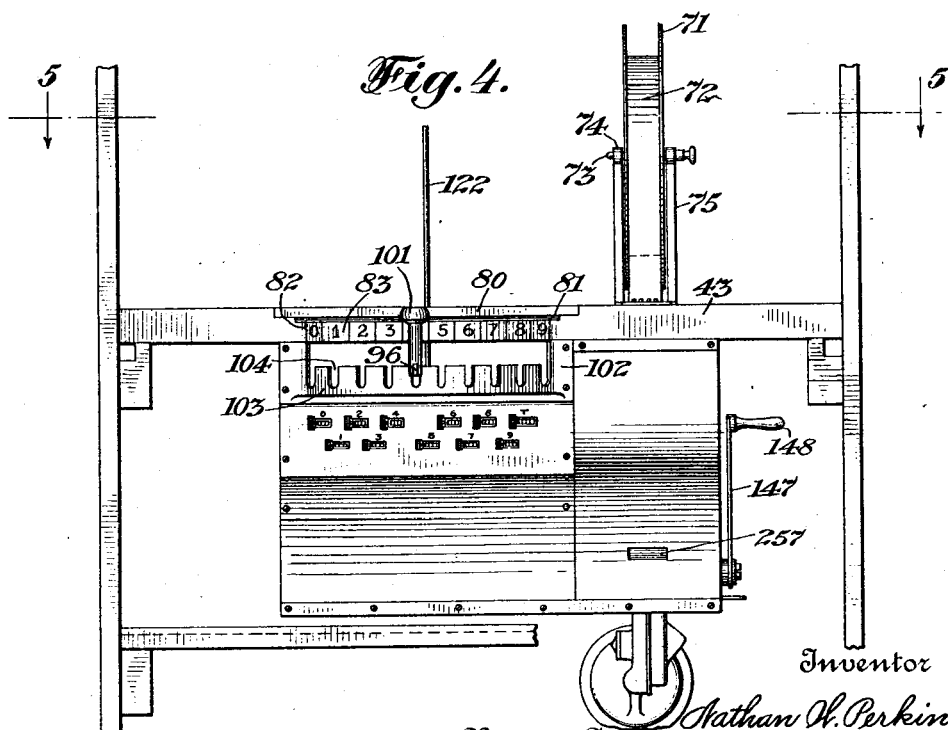
Fig. 4 is an enlarged elevation taken at the rear of the machine showing the location of the operating mechanism.

As indicated in Fig. 16 of the drawing the lever 344 is directly connected to the bar 333 by an arm 353 so that, as hereinbefore stated, the recording counter operated by the lever 344 and designated at "T" in Fig. 4, meaning the total number of tickets printed is operated every time the mechanism is actuated to print a ticket.

The shaft 122 passes through an opening provided therefor in the table 43 and at an appreciable distance above the table is connected to a similar shaft 354 by a hinged joint 355. The shaft 354 is connected to a shaft 356 along a division line 357, one part having a suitable recess and the other a corresponding projection in order to permit the shaft 354 and the shaft 356 to be connected by a collar 358 adapted to slide over the joint between the shafts 354 and 356 to connect the same. The collar 358 has a flange 359 in which there is a pin 360 adapted to lie in a recess 361 in the shaft 354 to lock the collar in position, while the pin 360 is provided with a flattened face 362 so that when turned to the position opposite to that shown in Fig. 29 the sleeve will be unlocked and may be caused to slide on the shafts 354 and 356 to the position shown in Fig. 30 in order to swing the shaft 354 from the shaft 356 when it is unnecessary for any reason to operate the counting devices hereinafter described which are actuated by the shaft 356 when connected to the shaft 354 and the shaft 122 so as to operate these counting devices when these shafts are moved downwardly through the downward movement of the shaft 122, as hereinbefore described.

Figure 11:
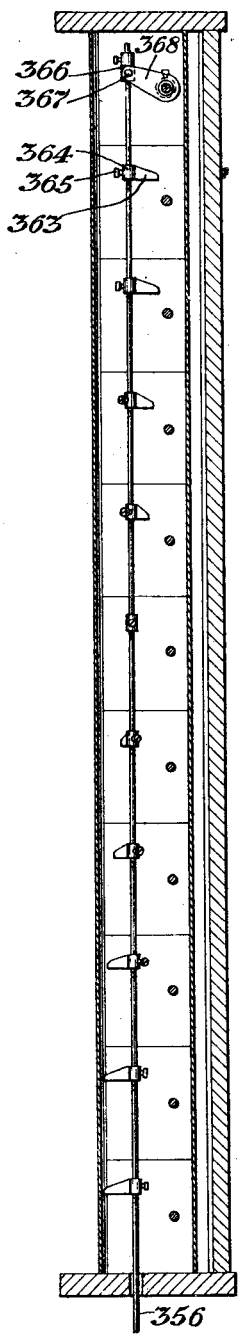
Fig. 11 is a sectional elevation on line 13—13, Fig. 6.
Figure 12:
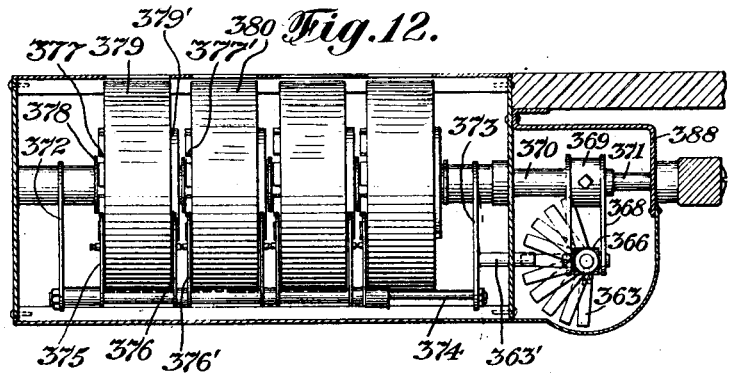
Fig. 12 is an enlarged plan taken on line 12—12, Fig. 6.
Figure 13:
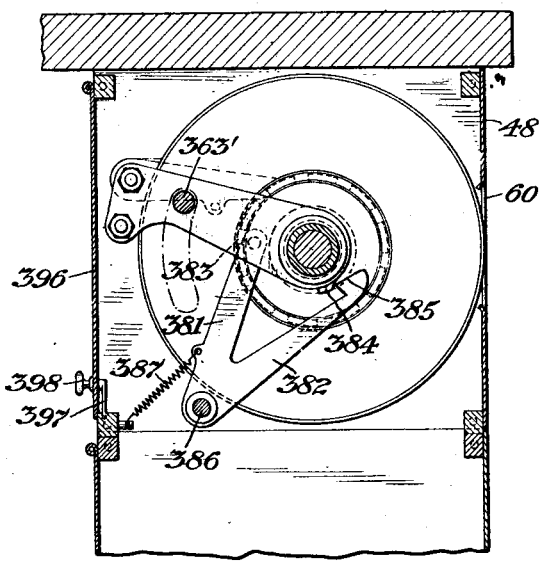
Fig. 13 is an enlarged sectional elevation showing the mechanism for operating the recording devices shown in Fig. 12.
Figure 14:
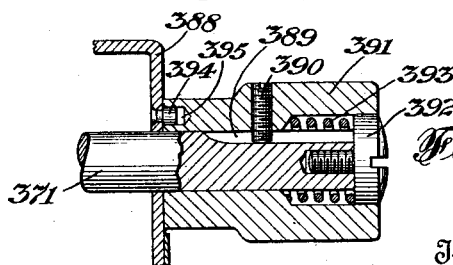
Fig. 14 is a longitudinal section of the knob for resetting the recording devices shown in Fig. 12.

As clearly shown in Figs. 6 and 11, for example, the shaft 356 extends upwardly in the superstructure to a point adjacent the top thereof, and in spaced positions is provided with a plurality of arms 363 each carried by a collar 364 and set in the necessary position on the shaft 356 by a set screw 365 or otherwise. At the upper end of the shaft 356 there is a collar below which is fitted a bearing block 366. The bearing block 366 is journaled on two trunnions 367 on the ends of arms 368 carried by a collar 369 which is secured to a sleeve 370 on a shaft 371. The shaft 371 and the sleeve 370 carried thereby are parts of the uppermost counter mechanism which records the total amount of money expended for tickets printed and disbursed by the machine and this particular counter mechanism is therefore operated through the devices, hereinbefore described, each time the machine prints a ticket. The superstructure contains a plurality of these indicating counters one of which is shown in Fig. 12. These counters correspond in number to the predetermined number of tickets which the machine is designed to print and as these devices are similarly constructed and similarly operated, each being actuated by the corresponding arm 363 which, when the shaft 365 is turned to the position corresponding to the number of the ticket printed in that position, contacts with a pin 363' to actuate these indicating counters but one of which will be described and that not in all its details because the form of counter illustrated is the subject matter of a separate invention and any well known form of counter may be used for this particular purpose. In each of these counters on the sleeve 370 there are arms 372 and 373, by the latter of which the pin 363' is carried. The free ends of these arms 372 and 373 are connected by a rod 374 which carries a pawl 375 for engaging notches 377 in a ring or flange 378 connected to the drum 379 which, in this instance, is a drum containing the figures for the unit column as the same appears in the counter. The counter may include any number of similar drums, and, for example, as indicated in Fig. 12 the next adjacent drum 380 is the drum which contains the figures for the tens column as the same appear in the counter. On the drum 379 is a flange 379' which contains a notch engaged by the pawl 376 which, through any suitable means, is connected with a pawl 376' which engages with the notches 377' in a flange on the drum 380 corresponding to the flange 378 carried by the drum 379, and in this manner the drums are successively connected and operated, it being understood that any suitable means may be employed for maintaining the pawls in contact with their respective drums and also for maintaining the arms 372 and 373 and the rod 374 together with these pawls as carried thereby, in their normal positions. In this counter mechanism each of the drums is provided with means for locking the same in position and preventing the same from being turned more than a predetermined portion of a revolution, a device for this purpose, as will be understood, being associated with each of the drums. This device, as indicated in Fig. 13, may include a rocker lever, the arms of which are indicated at 381 and 382. At the end of the rocker lever 381 there is a stop block 383 adapted to enter successively the recesses 377 in the flange 378 of the drum 379 for example. The end of the arm 382 of this rocker lever includes a tooth 385 adapted to be engaged by a cam 384 or other similar device carried by a member operated from the arms 372 and 373 so that each time the arms are operated to actuate the counter the rocker lever is swung on its pivotal connection 386 against the action of a spring 387 to withdraw the stop block 383 from the recess with which it is then in engagement so that after the operating pawl has been moved to the position to engage the next successive notch or recess the drum will be released and turned a predetermined portion of a revolution by the return of the pawl to its normal position when, as will be understood, the lock block 383 engages the next successive notch or recess to lock the drum in position until it is again actuated. The shaft 371 passes through an opening provided therefor in a portion of the indicator counter casing 388, and exteriorly of the casing this shaft is provided with a longitudinal groove 389 to which there extends a screw 390 passing through a knob 391 slidably mounted on that portion of the shaft which is exterior of the casing and normally maintained in position against the casing by a screw 392 turned into a tapped opening provided therefor in the extremity of the shaft, the head of the screw coacting with a spring 393 for this purpose. The knob 391 is normally maintained in a predetermined position by a pin 394 fixed in the casing 388 and adapted to enter a recess 395 provided therefor in the inner end of the knob, and this counter mechanism is so constructed that the parts thereof may all be returned to a normal position, that is, all the drums of the counter may be returned to an initial position by sliding the knob outwardly along the shaft so as to free the pin 394 from the recess 395 and then imparting one complete revolution to the shaft 371 by turning the knob 391 a corresponding extent. This mechanism, however, as hereinbefore stated, forms the subject matter of a separate invention and for this reason is not herein specifically shown and described. At the rear thereof each counter mechanism is enclosed in the compartment by a suitably hinged door which may be maintained in its closed position by a latch 397 operated by a knob or button 398. The counter shown in Figs. 12, 13 and 14 is one of those employed in the tier of counters indicated at 61 to 70.

In the upper portion of the superstructure and on the side opposite that in which the counters, as hereinbefore described are located, there is a drum 399 mounted on a shaft 400. The surface of this drum appears through the opening 49 and carries a series of numerals to indicate the number of the race for which tickets for wagers are being sold at the time. The machine as indicated in Fig. 1 has this drum set for the first race. The drum 399 may be turned to any desired position by means of a sprocket 401 mounted on the shaft 400 and a chain 402 which passes over the sprocket 401 and also over sprockets 403 and 404. The sprocket 403 is mounted on a shaft journaled in the frame and the sprocket 405 is journaled on a shaft mounted in the arms 406. These arms 406 are pivotally mounted on a shaft 407 at corresponding ends thereof, while extending between the opposite ends of the arms 406 there is a rod 408. Pivotally mounted on this rod 408 is a rod 409 which passes through a bracket 410 and above the same is provided with an adjusting screw 411 by which, as will be understood, the positions of the arms and the sprocket 404 may be adjusted to vary the tension on the chain. Beneath the drum 399 there is a plurality of sets of drums corresponding in number with the number of predetermined tickets which the apparatus is designed to print. The drum in the uppermost recess is indicated at 412 and is mounted on a shaft 413 on which there is a sprocket 415 over which passes a chain 414. The chain 414 also passes over a sprocket 416 mounted on the shaft 405 and over sprockets on the shafts on which the other corresponding numbers are mounted to a point adjacent the bottom of the superstructure where the chain also passes over a sprocket 417 mounted on a shaft 418, and this sprocket may be provided with a series of pins adapted to be engaged by a latch lever 419 pivotally mounted at 420 and adapted to be maintained in position against one of the pins by a spring 421 or otherwise to lock the chain and consequently the series of drums in any predetermined position in which they may be set. The faces of these drums appear in the openings 50 to 59 inclusive, in the board comprising the front of the superstructure, and as illustrated there are four drums in each of these series so that corresponding numbers in the tens, hundreds and thousands columns may be set to indicate the numbers of the horses designated in any given race, while the drums constituting the unit series are set or made permanent to indicate successively the corresponding numbers by which the horses are designated as is plainly indicated in Fig. 1.

Immediately at the rear of each of the openings 50 to 59 inclusive, and at the right of the numerals appearing in the same there is a hinged back 422. Each of these hinged backs is pivotally mounted as indicated at 423 and provided with an arm 424 which is connected to a rod 425 extending and connected to the arm 424 of each of these hinged backs so as to be operated from the lower portion of the superstructure from the position shown in Fig. 9 to that indicated in Fig. 10. Each of these hinged backs provides a pocket for the reception of a card 426 upon which is printed the name of the horse corresponding to the number by which the horse is designated in the race for which the wager tickets are being issued by the operation of the machine as is clearly indicated in Fig. 1 of the drawing.

In the use of the machine after a customer has ordered a ticket either by name or by number, or both, the operator grasps the handle 101 and swings it horizontally to the position corresponding to the name and number requested by the purchaser. In so swinging the handle 101, the operator turns the type wheel 266, the same being the unit type wheel of the series, to the position in which the number desired is in position to coact with the printing platen for printing this number on a ticket. This movement of the operating or selecting handle also through the rack 283 moves the printing devices 285 into position to also cooperate with the printing platen to print the serial number on the ticket. In swinging the handle 101 to position the operator also by means of the rack and the arm moves the plunger rod 331 into place to operate the devices actuating the corresponding counters 350. Still furthermore in this movement of the selecting handle the operator through the arm 110 and the collar 108 has turned the rod 122 and through the same the rods 354 and 356 to the necessary position for operating the corresponding indicator in the set thereof designated by 61 to 70. The operator then depresses the handle 16 and in doing so causes the latch end of the lever 130 to engage with the threads on the surface of the cone 108 to so lock the parts in this position that the handle 101 and the lever 96 to which it is connected cannot be raised until the lock is released and the lock is not released until after the apparatus has completed printing a ticket. When the operating handle is depressed to its fullest extent the conical end 108' of the collar 108 contacts with the roller 139 and operating through the arms 137 and 138 imparts a partial revolution to the rocker shaft 134. This movement, as hereinbefore described, trips the devices for operating the clutch mechanism and through the same causes the disk 169 to be driven through a complete turn by the motor when the motor is used in order to operate the devices for swinging the platen and operating the mechanism for feeding and cutting the tickets from the strip or roll of paper, as also hereinbefore described, and when the printing operation has been completed the latch end of the lever 130 is released from the collar 108 to unlock the parts making a repitition of the operation of the machine possible. In this operation, as will be understood, the drive shaft 113 is turned through approximately one-sixth of a complete revolution and back again. The rocking movement imparted to the main drive shaft causes the platen to be swung into operative engagement with the type wheels for printing the predetermined number on the ticket and also into operative engagement with the corresponding type disk for printing the serial number on the ticket, the printing operation being accomplished through the intervention of the ink ribbons as shown and described. By means of the arms 305, 302 and 300 and the parts connected therewith the actuating pawls of the series of serial numbering wheel are moved, the ticket feed pawl is caused to engage the next succeeding tooth of its ratchet wheel and the bell crank lever 228 on the knife arms engages the notch in the links 192. The cranks 115 and 116 at the same time will have actuated the rod to operate the corresponding counter in the upper series thereof and also the counter in this series which shows the total amount. Simultaneously the rod 333 is actuated to operate the corresponding lower counter and the counter for totaling the entire number of tickets sold. On the return stroke of the platen the knife is raised permitting the passage of the printed ticket which is then fed forward and at the finish of the return stroke the raised knife is released and severs the ticket from the strip, the ticket falling into the guide 257 and passing to the shelf where it may be taken by the operator and passed to the purchaser upon the payment therefor.

The machine also may be operated manually in the event of the failure of the power to operate the motor or otherwise. This is accomplished by the arm 187 and the clutch which may be disengaged from the motor shaft and made to engage with the power shaft through the operating handle 147.

I claim as my invention:

1. In an apparatus of the class described a plurality of associated type wheels, a platen co-operating with the type wheels for printing a number on a ticket, means for normally maintaining the platen in an inoperative position, means for turning the unit type wheel for selecting a predetermined number to be printed, devices for locking the selecting means and simultaneously releasing the platen, and means for then operating the platen, and after the printing operation to simultaneously release the selecting means, and return the platen to its normal inoperative position.

2. In an apparatus of the class described, a plurality of associated type wheels each having a plurality of numbers thereon, a platen for co-acting with the type wheels for printing a number on a ticket in a strip of the same, means whereby the platen is normally maintained in an inoperative position, devices for turning the unit type wheel for selecting a predetermined number to be printed, means for severing a ticket from a strip of the same, and means whereby in the operation thereof the selecting means are locked and the platen released; and after the printing operation the selecting means are released, the platen returned to its normal inoperative position, and the ticket simultaneously severed from the strip of the same.

3. In an apparatus of the class described, a plurality of associated type wheels each having a plurality of numbers thereon, a platen coacting with the said type wheels, means for turning the unit type wheel for selecting a number to be printed on a ticket, means for locking the platen in an inoperative position, means for simultaneously releasing the platen and locking the said selecting devices, and means operative upon the completion of the printing operation for simultaneously relocking the printing devices and releasing the selecting devices.

4. In an apparatus of the class described, a plurality of associated type wheels each having a series of numerals thereon, a platen co-acting with the type wheels for printing a number on a ticket in a strip of the same, means for normally maintaining the platen in an initial inoperative position, means for actuating the unit type wheel for selecting a number to be printed on the ticket, means for cutting the ticket from the strip thereof, means for feeding the ticket strip to position for printing the ticket, and devices for locking the selecting means and releasing the platen, and after the printing operation to release the selecting means and return the platen to its initial inoperative position, and simultaneously to cut the printed ticket from the strip thereof, and to feed the ticket strip to bring the end thereof into the next succeeding printing position.

5. In an apparatus of the class described, devices for printing one of a plurality of predetermined numbers on a ticket in a strip of the same, a corresponding number of devices for printing serial numbers on each of the tickets to be printed, means for simultaneously selecting the number to be printed and shifting to position the serial number printing devices, and means for operating the printing devices to simultaneously print the predetermined number and also the serial number thereon.

6. In an apparatus of the class described, devices for printing one of a plurality of predetermined numbers on a ticket in a strip of the same, a corresponding number of devices for printing serial numbers on each of the tickets to be printed, means for simultaneously selecting the number to be printed and shifting to position the serial number printing devices, means for operating the printing devices to simultaneously print the predetermined number and also the serial number thereon, means operated by the printing devices for setting the selected serial number printing device to the next succeeding number after the printing operation has been completed, registering devices for counting the tickets of each predetermined number printed, and means for actuating the registering device.

7. In an apparatus of the class described, devices for printing one of a plurality of predetermined numbers on a ticket in a strip of the same, a corresponding number of devices for printing serial numbers on each of the tickets to be printed, means for simultaneously selecting the number to be printed and shifting to position the serial number printing devices, means for operating the printing devices to simultaneously print the predetermined number and also the serial number theron, means operated by the printing devices for setting the selected serial number printing device to the next succeeding number after the printing operation has been completed, registering devices for counting the tickets of each predetermined number printed, registering devices for counting the total number of tickets printed, and means for simultaneously actuating both the registering devices.

8. In an apparatus of the class described, a plurality of associated type wheels each having a series of numerals thereon, a platen coacting with the type wheels for printing one of a plurality of predetermined numbers on a ticket, devices for actuating the units type wheel for selecting the number to be printed, a power shaft, devices connecting the power shaft with the platen to operate the platen from the power shaft, means for normally locking the power shaft in an inoperative position, means for simultaneously locking the selecting devices and releasing the power shaft to permit the operation thereof, and means for releasing the selecting devices after the power shaft has been actuated to impart a complete movement to the platen and then relocking the power shaft.

9. In an apparatus of the class described, devices for printing one of a plurality of predetermined numbers, means for selecting the number to be printed, a shaft operated manually or by power to actuate the printing devices, a clutch associated with the said shaft, means for shifting the clutch to the positions for operating the shaft by manual or by power, means for normally maintaining the shaft in an inoperative position, means for locking the selecting devices and normally releasing the said shaft, and means for releasing the selecting devices and setting the shaft in its inoperative position after the printing devices have been actuated.

10. In an apparatus of the class described, devices for printing one of a plurality of predetermined numbers, means for selecting the number to be printed, a shaft operated manually or by power to actuate the printing devices, a clutch associated with the said shaft, means for shifting the clutch to positions for operating the shaft by manual or by power, means operative when the clutch is set to operate the shaft manually for locking the said shaft in an inoperative position, means actuated by the selecting means for releasing the aforesaid means, and means for resetting the means for maintaining the shaft in an inoperative position after the printing operation has been completed.

11. In an apparatus of the class described, devices for printing one of a plurality of predetermined numbers, means for selecting the number to be printed, a shaft operated manually or by power to actuate the printing devices, a clutch associated with the said shaft, means for shifting the clutch to the positions for operating the shaft by manual or by power, means operative when the clutch is set to actuate the shaft manually for normally maintaining the shaft in an inoperative position, means actuated by the selecting means for releasing the aforesaid means, means for preventing the return of the shaft to its inoperative position until the printing operation has been completed, and means whereby when the printing operation is completed the shaft is held in its normally inoperative position.

12. In an apparatus of the class described, devices for printing one of a plurality of predetermined numbers, means for selecting the number to be printed, a shaft operated manually or by power to actuate the printing devices, a clutch associated with the said shaft, means for shifting the clutch to the positions for operating the shaft by manual or by power, means operative when the clutch is set to actuate the shaft manually for normally maintaining the shaft in an inoperative position, devices actuated by the selecting means for simultaneously locking the selecting means and releasing the devices for normally maintaining the shaft in an inoperative position, and devices operative after the printing operation is completed for simultaneously releasing the selecting means and maintaining the shaft in its normal inoperative position.

13. In an apparatus of the class described, devices for printing one of a plurality of predetermined numbers, means for selecting the number to be printed, a shaft operated manually or by power to actuate the printing devices, a clutch associated with the said shaft, means for shifting the clutch to the positions for operating the shaft by manual or by power, means operative when the clutch is set to actuate the shaft manually for normally maintaining the shaft in an inoperative position, means for preventing the return of the shaft to its normal inoperative position until the printing operation is completed, and means then operative for simultaneously releasing the selecting means and maintaining the said shaft in its inoperative position.

14. In an apparatus of the class described, devices for printing one of a plurality of predetermined numbers, means for selecting the number to be printed, a shaft operated manually or by power to actuate the printing devices, a clutch associated with the said shaft, means for shifting the clutch to positions for operating the shaft by manual or by power; means, operative when the shaft is actuated by power for normally disconnecting the shaft from the source of power, and means actuated by the selecting devices for releasing the aforesaid means to cause the shaft to be operated from the source of power, to actuate the printing devices.

15. In an apparatus of the class described, devices for printing one of a plurality of predetermined numbers, means for selecting the number to be printed, a shaft for operating the printing devices, a motor, devices for connecting and disconnecting the said motor to and from the said shaft, means actuated by the selecting devices for simultaneously locking the same in position and actuating the devices for connecting and disconnecting the said shaft and motor, and means operative when the printing operation is completed for simultaneously releasing the selecting devices and operating the means for connecting and disconnecting the shaft and the motor.

16. In an apparatus of the class described, devices for printing one of a plurality of predetermined numbers, means for selecting the number to be printed, a shaft operated manually or by power to actuate the printing devices, a motor, devices for connecting and disconnecting the said motor to and from the said shaft, a clutch, means for shifting the clutch to positions for operating the shaft manually or by the motor, means operative by the clutch when set in the position for operating the shaft manually for rendering inoperative the devices for connecting and disconnecting the shaft and the motor, devices for normally maintaining the shaft in an inoperative position when the clutch is set to operate the shaft manually, and means actuated by the selecting devices for releasing the last aforesaid devices.

17. In an apparatus of the class described, devices for printing one of a plurality of predetermined numbers, means for selecting the number to be printed, a shaft operated manually or by power to actuate the printing devices, a motor, devices for connecting and disconnecting the said motor to and from the said shaft, a clutch, means for shifting the clutch to positions for operating the shaft manually or by the motor, means operative by the clutch when set in the position for operating the shaft manually for rendering inoperative the devices for connecting and disconnecting the shaft and the motor, devices for maintaining the shaft in an inoperative position when the clutch is set for the manual operation of the shaft, means for rendering said devices inoperative when the clutch is set for the operation of the shaft by the motor, and devices operated by the selecting devices for connecting and disconnecting the said shaft to and from the said motor.

18. In an apparatus of the class described, devices for printing one of a plurality of predetermined numbers, means for selecting the number to be printed, a shaft operated manually or by power to actuate the printing devices, a motor, devices for connecting and disconnecting the said motor to and from the said shaft, a clutch, means for shifting the clutch to positions for operating the shaft manually or by the motor, means operative by the clutch when set in the position for operating the shaft manually for rendering inoperative the devices for connecting and disconnecting the shaft and the motor, devices for maintaining the shaft in an inoperative position when the clutch is set for the manual operation of the shaft, means for rendering said devices inoperative when the clutch is set for the operation of the shaft by the motor, devices operated by the selecting devices for simultaneously locking the selecting devices and operating the means for connecting and disconnecting the shaft and the motor, and means operative after the completion of a printing operation for releasing the selecting devices and again operating the means for connecting and disconnecting the shaft and motor to disconnect the shaft from the motor and again cause the same to be inoperative.

Signed by me this 26 day of July, 1921.

NATHAN W. PERKINS.